(12) United States Patent
Singh et al.

(10) Patent No.: US 10,942,790 B2
(45) Date of Patent: Mar. 9, 2021

(54) AUTOMATED-APPLICATION-RELEASE-MANAGEMENT SUBSYSTEM THAT INCORPORATES SCRIPT TASKS WITHIN APPLICATION-RELEASE-MANAGEMENT PIPELINES

(71) Applicant: VMWARE, INC., Palo Alto, CA (US)

(72) Inventors: Kiran Singh, Bangalore (IN); Ankit Shrivastava, Bangalore (IN); Mohammed Muneebuddin, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 284 days.

(21) Appl. No.: 15/075,216

(22) Filed: Mar. 21, 2016

(65) Prior Publication Data

US 2017/0161044 A1  Jun. 8, 2017

(30) Foreign Application Priority Data

Dec. 4, 2015  (IN) .......................... 6502/CHE/2015

(51) Int. Cl.
*G06F 9/50* (2006.01)
*G06F 9/455* (2018.01)

(52) U.S. Cl.
CPC ........ *G06F 9/5083* (2013.01); *G06F 9/45512* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| 2013/0174117 | A1* | 7/2013 | Watters | G06F 11/3664 717/106 |
| 2013/0262845 | A1* | 10/2013 | Pearson | G06F 8/71 713/1 |
| 2014/0122161 | A1* | 5/2014 | Gupta | G06Q 10/0633 705/7.26 |
| 2016/0019096 | A1* | 1/2016 | Winterfeldt | G06F 8/60 717/177 |

* cited by examiner

*Primary Examiner* — Lewis A Bullock, Jr.
*Assistant Examiner* — Melissa A Headly
(74) *Attorney, Agent, or Firm* — Clayton, McKay & Bailey, PC

(57) ABSTRACT

The current document is directed to an automated-application-release-management subsystem that executes application-release-management pipelines that includes one or more tasks and/or stages, execution of which launch execution of scripts on specified host computers. The capability for launching scripts from application-release-management-pipeline tasks and stages provides flexibility in design and development of application-release-management pipelines and provides an incremental path for migration of legacy-script-based application-release management to automated pipeline-based application-release management.

20 Claims, 40 Drawing Sheets

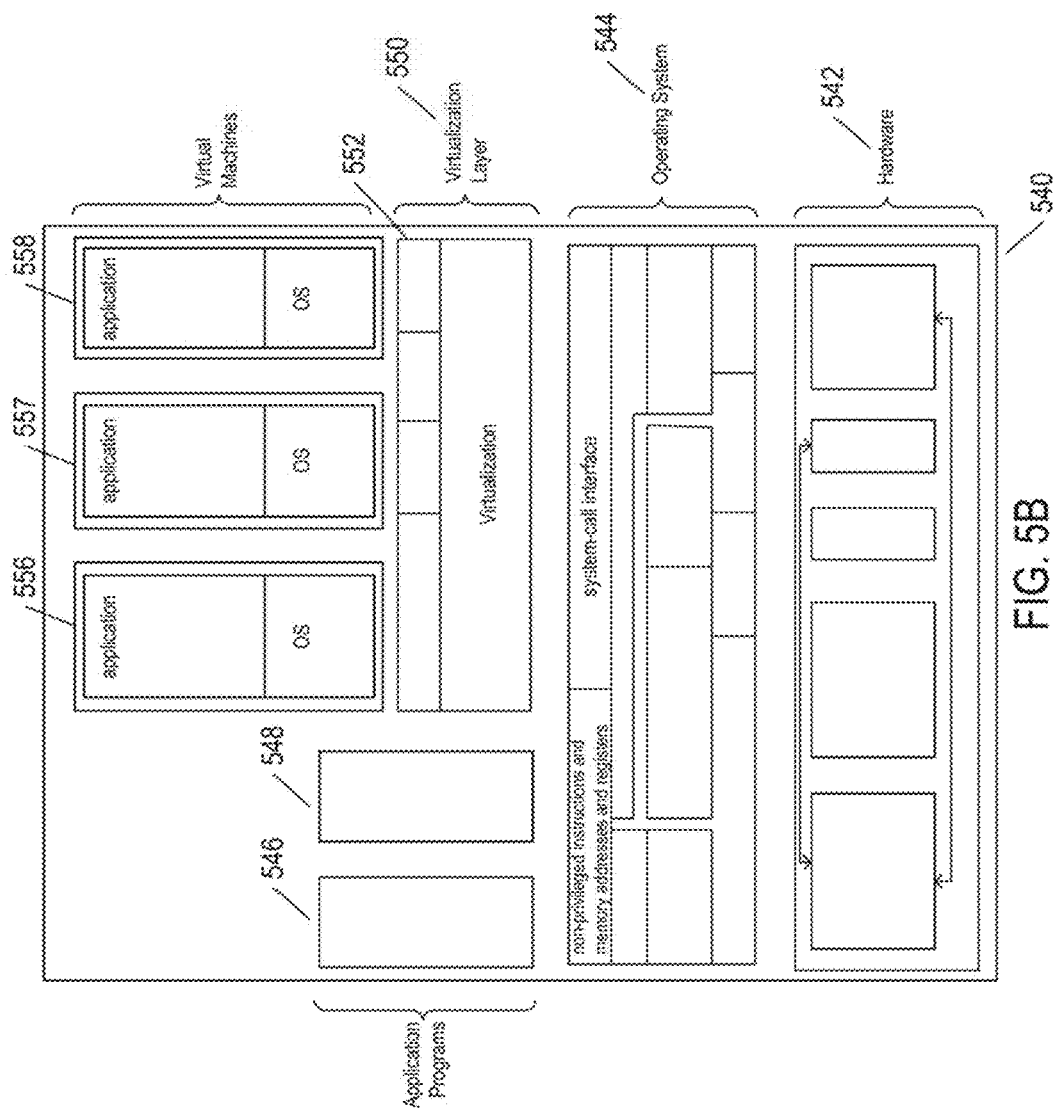

| | | | |
|---|---|---|---|
| 1402 | Start Workflow | The starting point of the workflow. All workflows contain this element. A workflow can have only one start element. Start elements have one output and no input, and cannot be removed from the workflow schema. | |
| 1408 | Scriptable task | General purpose tasks you define. You write JavaScript functions in this element. | |
| 1406 | Decision | A boolean function. Decision elements take one input parameters and return either true or false. The type of decision that the element makes depends on the type of the input parameter. Decision elements let the workflow branch into different directions, depending on the input parameter the decision element receives. If the received input parameter corresponds to an expected value, the workflow continues along a certain route. If the input is not the expected value, the workflow continues on an alternative path. | |
| 1407 | Custom decision | A boolean function. Custom decisions can take several input parameters and process them according to custom scripts. Returns either true or false. | |
| | Decision activity | A boolean function. A decision activity runs a workflow and binds its output parameters to a true or a false path. | |
| 1410 | User interaction | Lets users pass new input parameters to the workflow. You can design how the user interaction element presents the request for input parameters and place constraints on the parameters that users can provide. You can set permissions to determine which users can provide the input parameters. When a running workflow arrives at a user interaction element, it enters a passive state and prompts the user for input. You can set a timeout period within which the users must provide input. The workflow resumes according to the data the user passes to it, or returns an exception if the timeout period expires. While it is waiting for the user to respond, the workflow token is in the waiting. | |
| 1412 | Waiting timer | Used by long-running workflows. When a running workflow arrives at a Waiting Timer element, it enters a passive state. You set an absolute date at which the workflow resumes running. While it is waiting for the date, the workflow token is in the waiting-signal state. | |
| 1413 | Waiting event | Used in long-running workflows. When a running workflow arrives at a Waiting Event element, it enters a passive state. You define a trigger event that the workflow awaits before it resumes running. While it is waiting for the event, the workflow token is in the waiting-signal state. | |
| 1404 | End workflow | The end point of a workflow. You can have multiple end elements in a schema, to represent the various possible outcomes of the workflow. End elements have one input with no output. When a workflow reaches an End Workflow element, the workflow token enters the completed state. | |

FIG. 14A

| | | | |
|---|---|---|---|
| 1414 | Thrown exception | Creates an exception and stops the workflow. Multiple occurrences of this element can be present in the workflow schema. Exception elements have one input parameters, which can only be of the String type, and have no output parameter. When a workflow reaches an Exception element, the workflow token enters the failed state. | |
| 1426 | Workflow note | Lets you annotate sections of the workflow. You can stretch notes to delineate sections of the workflow. You can change the background color to the notes to differentiate workflow zones. Workflow notes provide only visual information, to help you understand the schema. | |
| 1424 | Action element | Calls on an action from the Orchestrator libraries of action. When a workflow reaches an action element, it calls and runs that action. | |
| 1422 | Workflow element | Starts another workflow synchronously. When a workflow reaches a Workflow element in its schema, it runs that workflow as part of its own process. The original workflow continues only after the called workflow completes its run. | |
| 1420 | Foreach element | Runs a workflow on every element from an array. For example, you can run the Rename Virtual Machine workflow on all virtual machines from a folder. | |
| 1423 | Asynchronous workflow | Starts a workflow asynchronously. When a workflow reaches an asynchronous workflow element, it starts that workflow and continues its own run. The original workflow does not wait for the called workflow to complete. | |
| 1428 | Schedule workflow | Create a task to run the workflow at a set time, and then the workflow continues its run | |
| 1429 | Nested workflows | Starts several workflows simultaneously. You can choose to nest local workflows and remote workflows that are in a different Orchestrator server. You can also run workflows with different credentials. The workflow waits for all the nested workflows to complete before continuing its run. | |
| 1415 | Handle error | Handles an error for a specific workflow element. The workflow can handle the error by creating an exception, calling another workflow, or running a custom script. | |
| 1416 | Default error handler | Handles workflow errors that are not caught by standard error handlers. You can use any available scheme elements to handle errors. | |
| 1418 | Switch | Switches to alternative workflow paths, based on workflow attribute or parameter. | |

FIG. 14B

| Server Role | Inbound Ports | Service/System Outbound Ports |
|---|---|---|
| vCloud Automation Center | | |
| vCenter Single Sign-On | 7444 | LDAP: 389<br>LDAPS: 636<br>vCenter Single Sign-On: 11711, 11712, 12721 |
| vCloud Automation Center virtual Appliance (VA) | 443, 5432*, 5672* | vCenter Single Sign-On Load Balancer: 7444<br><br>vCloud Automation Center virtual appliances (VA): 5432, 5672*<br><br>vCloud Automation Center Infrastructure Web Load Balancer: 443<br><br>vCloud Orchestrator Load Balancer: 8281<br><br>*This is a communication requirement between clustered vCAC virtual appliances. |
| Infrastructure Web Server | 135, 443, 1024-65535* | vCenter Single Sign-On Load Balancer: 7444<br>vCloud Automation Center virtual appliance Load Balancer: 443<br>MSSQL: 135, 1433, 1024-65535* |
| Infrastructure Manager Server | 135, 443, 1024-65535* | vCloud Automation Center Infrastructure Web Load Balancer: 443<br>MSSQL: 135, 1433, 1024-65535* |
| Infrastructure DEM Server | NA | vCenter Single Sign-On Load Balancer: 7444<br><br>vCloud Automation Center virtual appliance Load Balancer: 443<br><br>vCloud Automation Center Infrastructure Web Load Balancer: 443<br><br>vCloud Automation Center Infrastructure Manager Load Balancer: 443 |
| Infrastructure Agent Server | NA | vCloud Automation Center Infrastructure Web Load Balancer: 443<br><br>vCloud Automation Center Infrastructure Manager Load Balancer: 443 |
| MSSQL Database Server | 135, 1433, 1024-65535* | Infrastructure Web Server: 135, 1024-65535*<br><br>Infrastructure Management Server: 135, 1024-65535* |
| | Do not change or block these ports: | |
| vCloud Application Services Server | 8443 HTTPS User Interface connection<br><br>8080 HTTP (legacy port; do not use) | vCenter Single Sign-On: 1433<br><br>vCloud Automation Center virtual appliance Load Balancer: 443<br><br>vCloud Automation Center Infrastructure Web Load Balancer: 443 |
| vFabric RabbitMQ | 5671 AMQP over SSL | |
| External SSH connection | 22 | |
| Content Server | 80 HTTP (used to host OOB content, agent binary, and CLI binary) | |
| IT Business Management Suite Standard Edition Server | | vCenter Single Sign-On: 1433<br><br>vCloud Automation Center virtual appliance Load Balancer: 443<br><br>vCloud Automation Center Infrastructure Web Load Balancer: 443 |
| IT Business Management Suite Standard Edition UI connection | 443 HTTPS | |
| External SSH connection | 22 | |
| Web console access (VAMI) | 5480 | |

FIG. 16B

| Load Balancer | Ports Balanced |
|---|---|
| vCenter Single Sign-On Load Balancer | 7444 |
| vCloud Automation Center virtual appliance Load Balancer | 443 |
| vCloud Automation Center Infrastructure Web Load Balancer | 443 |
| vCloud Automation Center Infrastructure Manager Service Load Balancer | 443 |
| vCloud Orchestrator Load Balancer | 8281 |

FIG. 16C

```
fritz@DemoMachine:/home/fritz: cat configureAppServer.sh
echo "Configure app server";
echo "Dukes bank application repository URL: $APP_URL";

#wget -O APP_URL
echo "Configuring dukes bank application";

echo "Starting application on port: $APPLICATION_PORT";

MACHINE_IP=$(ifconfig | sed -En 's/127.0.0.1//;s/.*inet (addr:)?(([0-9]*\.){3}[0-9]*).*/\2/p')
printf "\nApplication URL: $MACHINE_IP:$APPLICATION_PORT/dukesBank/" > $SCRIPT_RESPONSE_FILE
```

AUTOMATED-APPLICATION-RELEASE-MANAGEMENT SUBSYSTEM THAT INCORPORATES SCRIPT TASKS WITHIN APPLICATION-RELEASE-MANAGEMENT PIPELINES

RELATED APPLICATIONS

Benefit is claimed under 35 U.S.C. 119(a)-(d) to Foreign application Serial No. 6502/CHE/2015 filed in India entitled "AUTOMATED-APPLICATION-RELEASE-MANAGEMENT SUBSYSTEM THAT INCORPORATES SCRIPT TASKS WITHIN APPLICATION-RELEASE-MANAGEMENT PIPELINES", on Dec. 4, 2015, by VMware, Inc., which is herein incorporated in its entirety by reference for all purposes.

TECHNICAL FIELD

The current document is directed to automated-application-release-management subsystems and, in particular, to automated-application-release-management subsystems that specify and execute application-release-management pipelines that include tasks and/or stages that execute scripts on host computers.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system management and administration. Currently, these needs have begun to be addressed by highly capable automated management and administration tools and facilities. As with many other types of computational systems and facilities, from operating systems to applications, many different types of automated administration and management facilities have emerged, providing many different products with overlapping functionalities, but each also providing unique functionalities and capabilities. Owners, managers, and users of large-scale computer systems continue to seek methods and technologies to provide efficient and cost-effective management and administration of cloud-computing facilities and other large-scale computer systems.

SUMMARY

The current document is directed to an automated-application-release-management subsystem that executes application-release-management pipelines that includes one or more tasks and/or stages, execution of which launch execution of scripts on specified host computers. The capability for launching scripts from application-release-management-pipeline tasks and stages provides flexibility in design and development of application-release-management pipelines and provides an incremental path for migration of legacy-script-based application-release management to automated pipeline-based application-release management.

BRIEF DESCRIPTION OF THE DRAWINGS

FIGS. 5A-B illustrate two types of virtual machine and virtual-machine execution environments.

FIGS. 14A-B include a table of different types of elements that may be included in a workflow.

FIGS. 16A-C illustrate an example implementation and configuration of virtual appliances within a cloud-computing facility that implement the workflow-based management and administration facilities of the above-described WFMAD.

FIGS. 24A-E illustrate automated-application-release-management-subsystem user interface facilities related to creating and configuring script tasks.

DETAILED DESCRIPTION OF EMBODIMENTS

Figure 1:
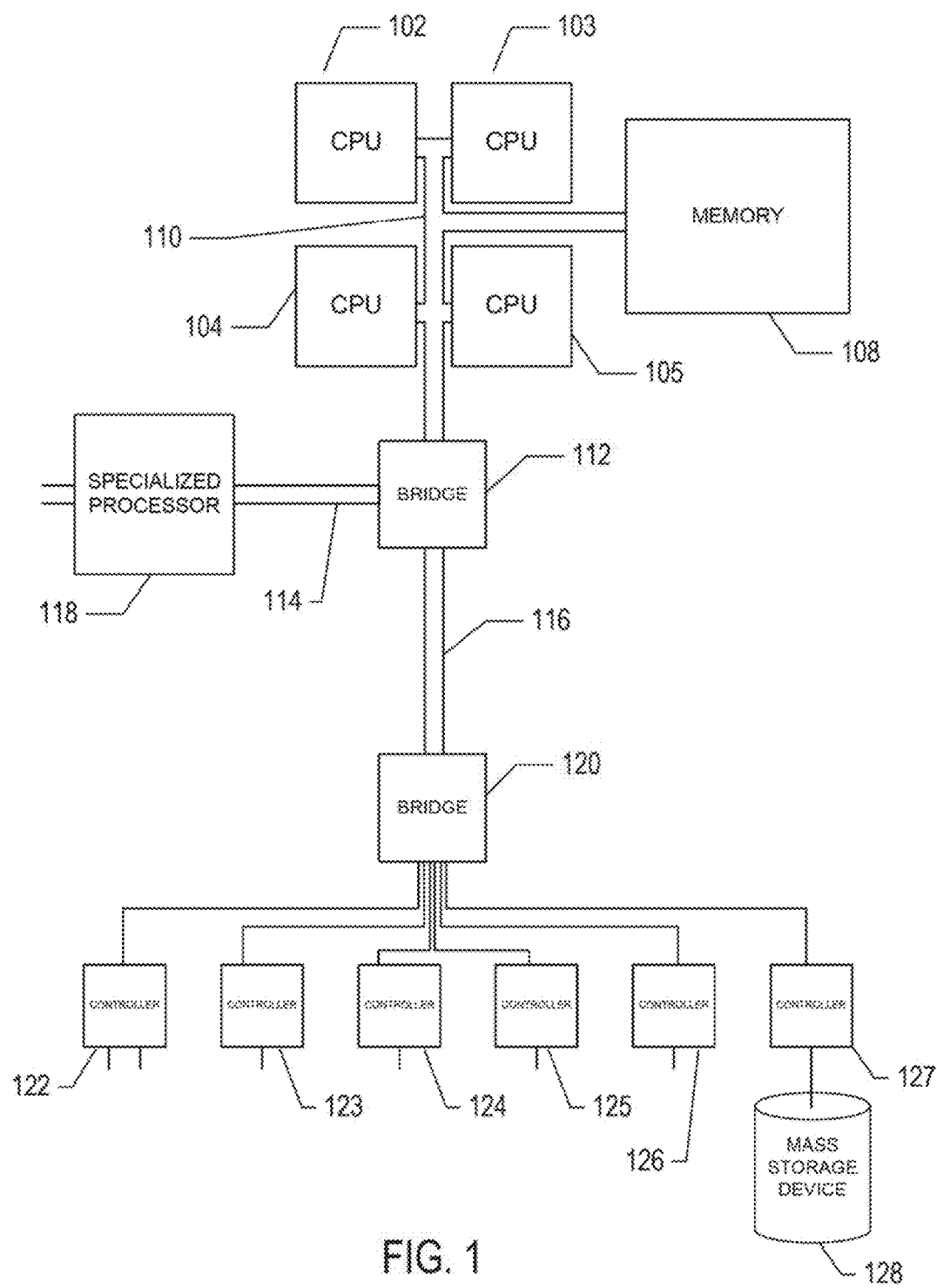
FIG. 1 provides a general architectural diagram for various types of computers.

The current document is directed toan automated-application-release-management subsystem that incorporates script tasks within application-release-management pipelines. In a first subsection, below, a detailed description of computer hardware, complex computational systems, and virtualization is provided with reference to FIGS. 1-10. In a second subsection, an overview of a workflow-based cloud-management facility is provided with reference to FIGS. 11-20B. In a third subsection, implementations of the currently disclosed automated-application-release-management subsystemare discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modem science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
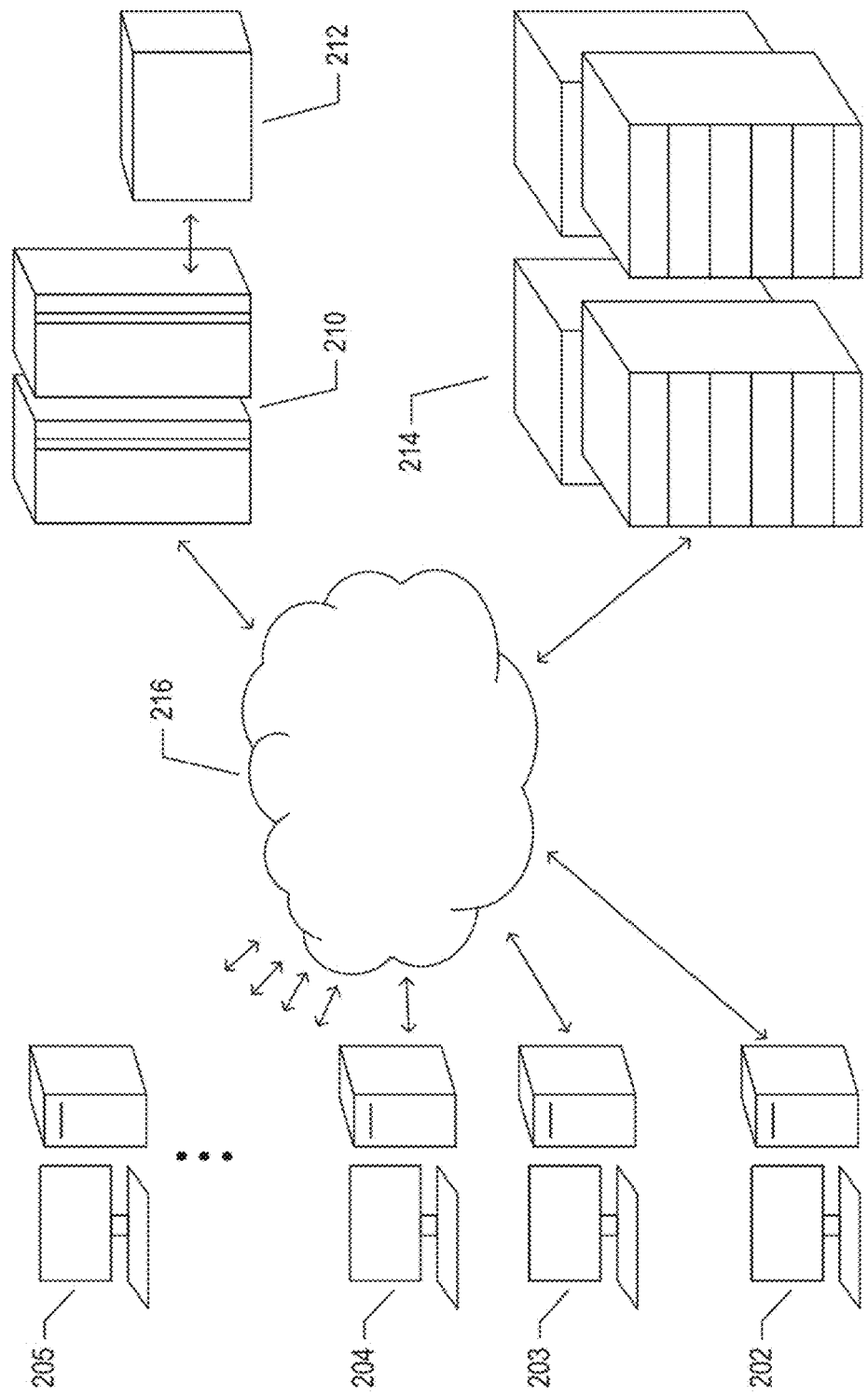
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
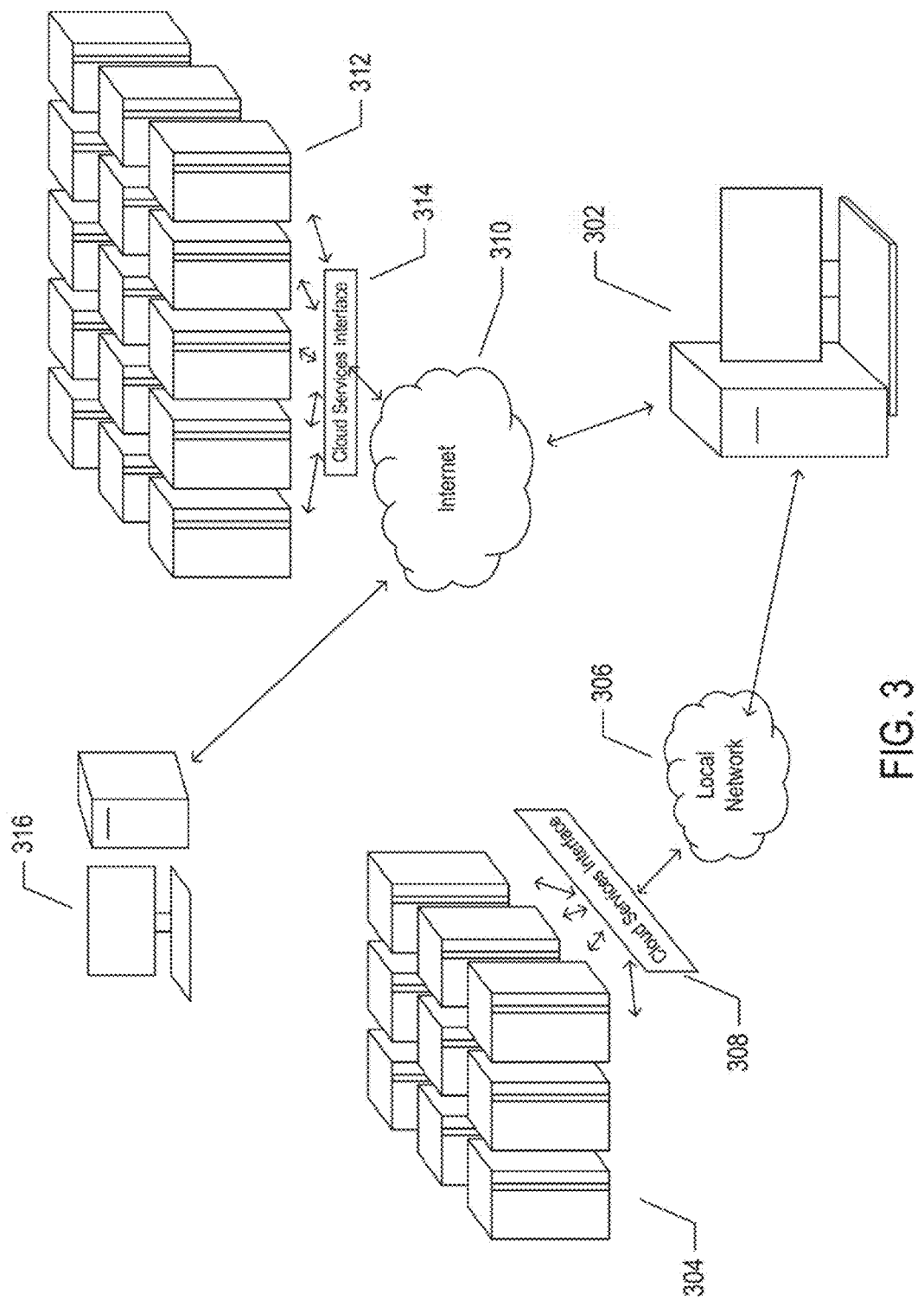
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
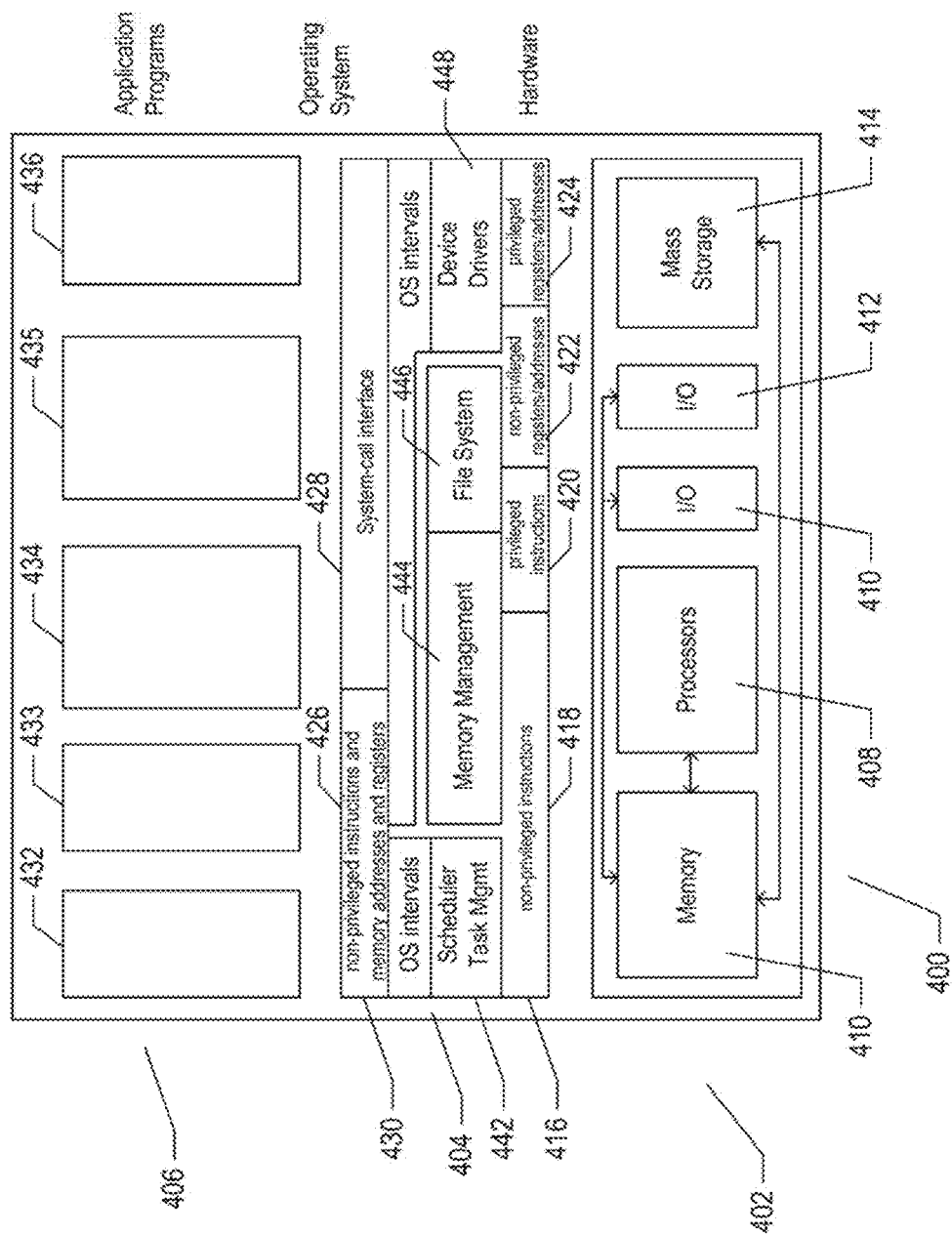
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modem operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
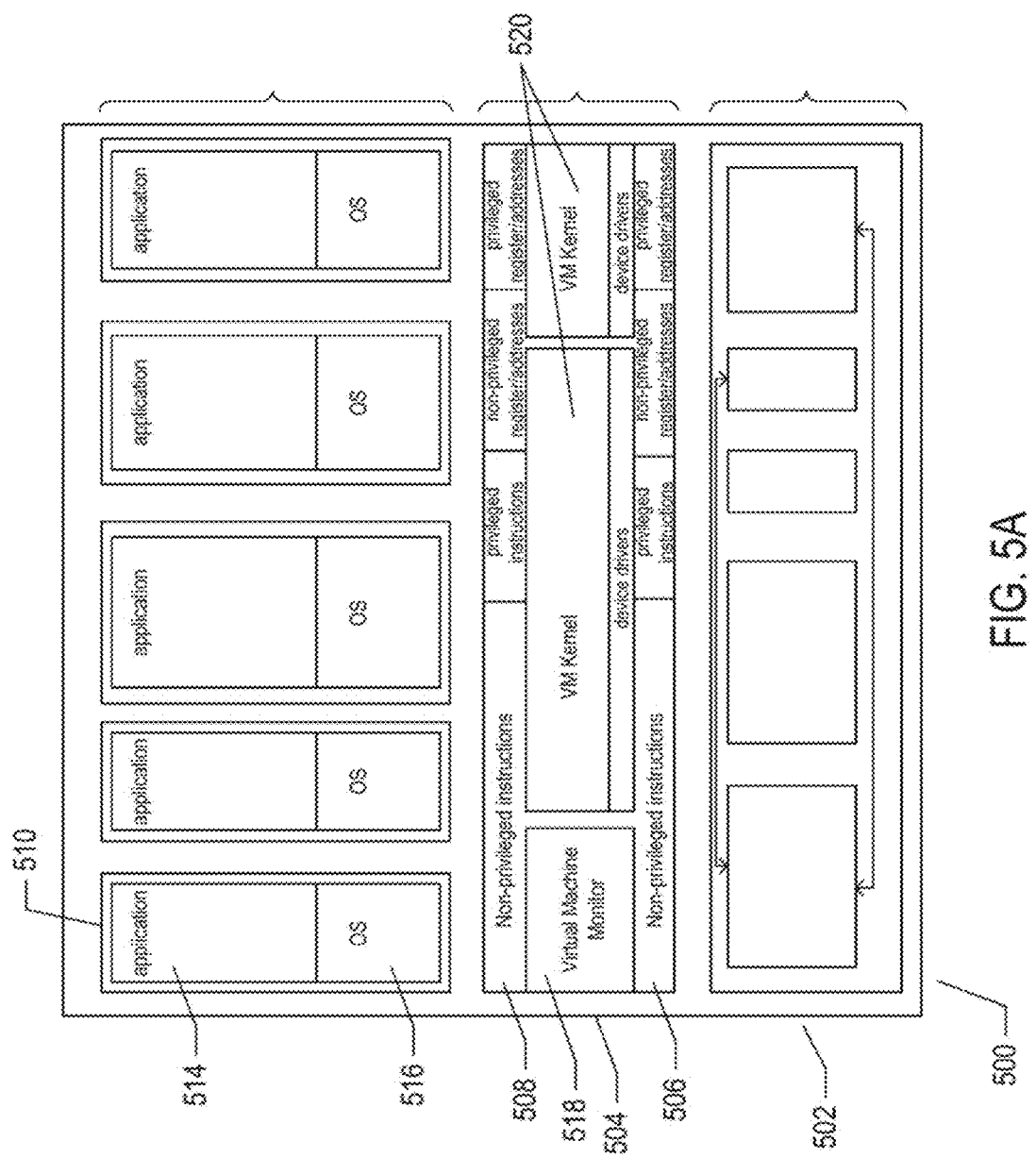

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5S, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to Figure 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
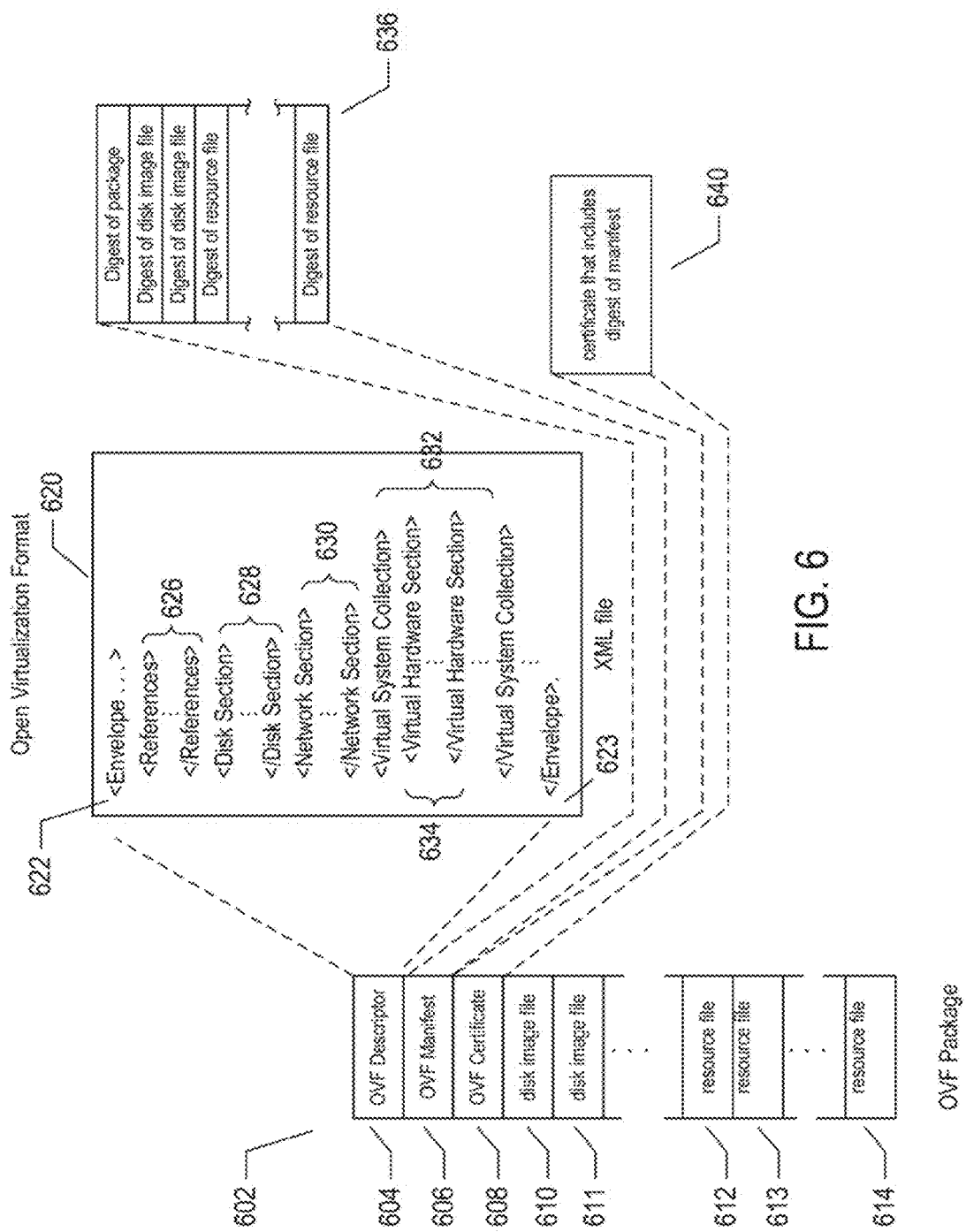
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
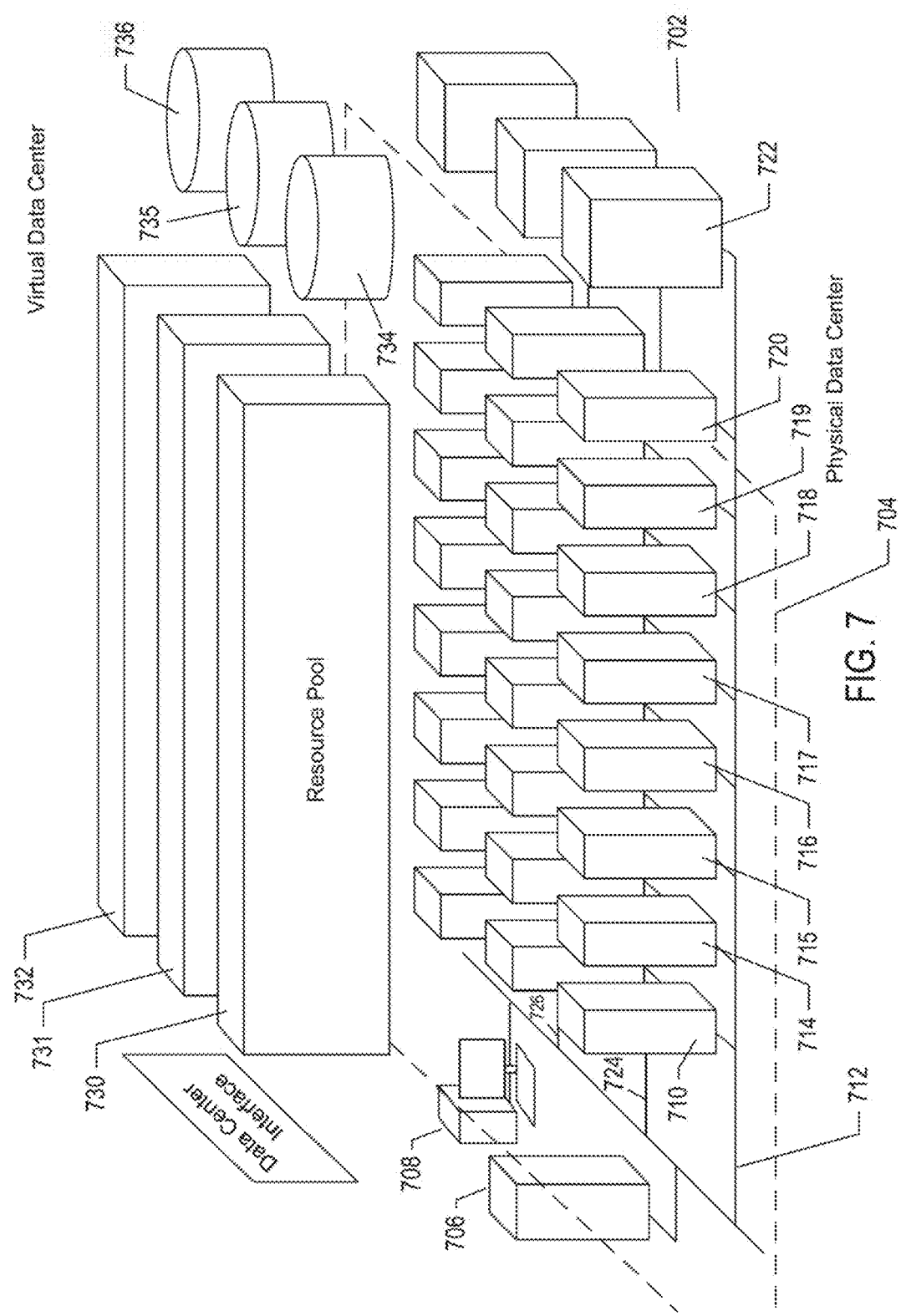
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
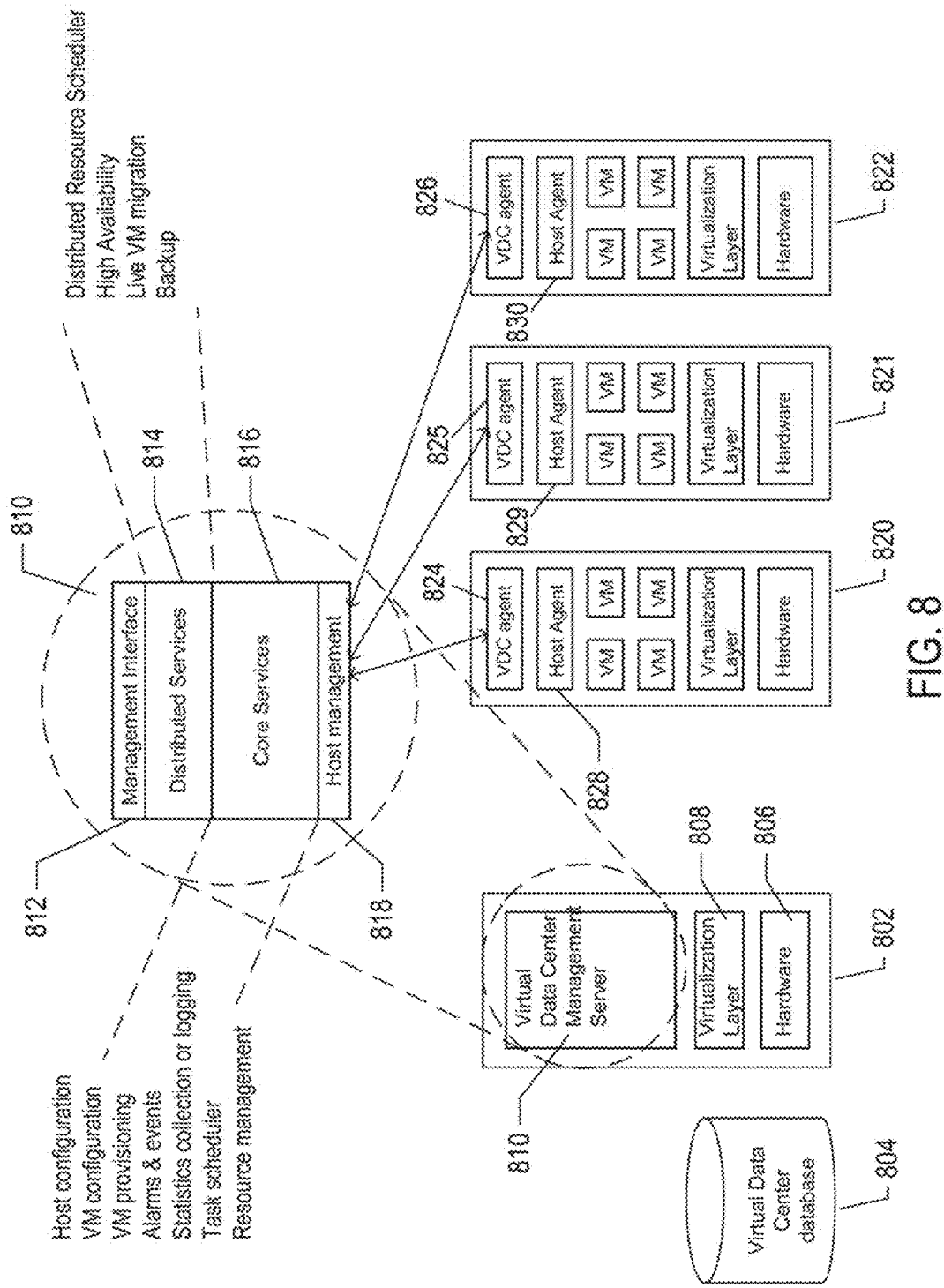
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
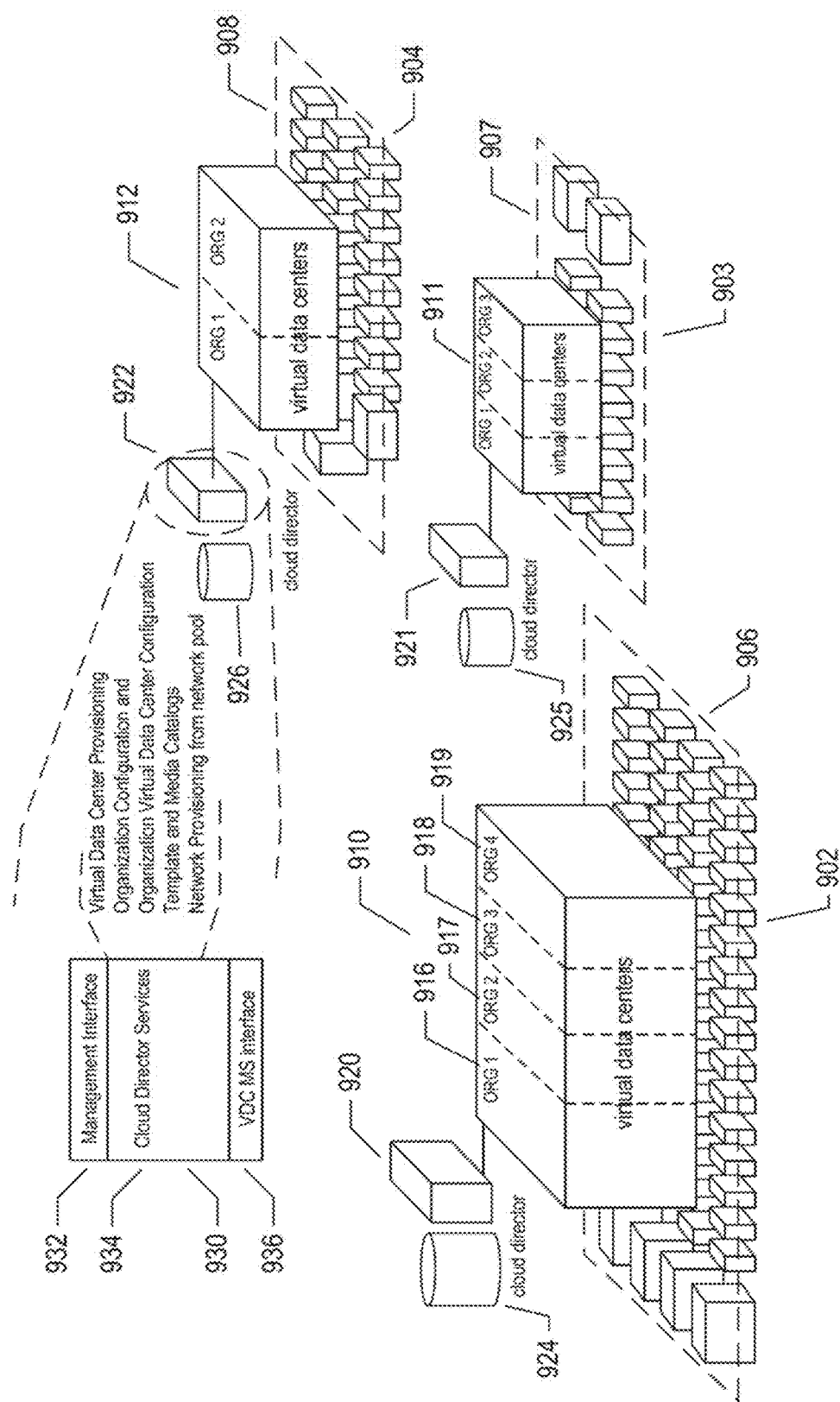
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
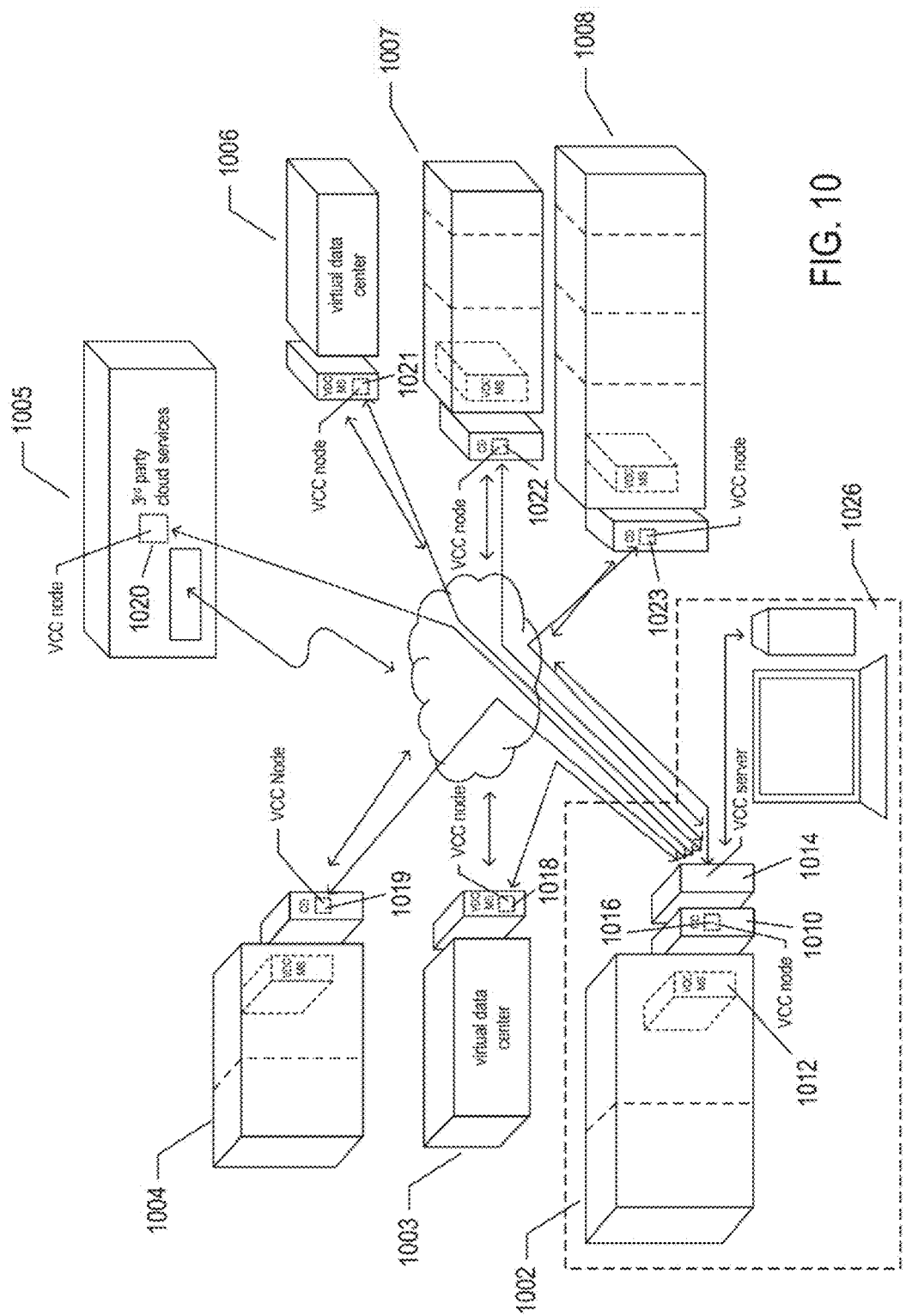
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal. PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Workflow-Based Cloud Management

Figure 11:
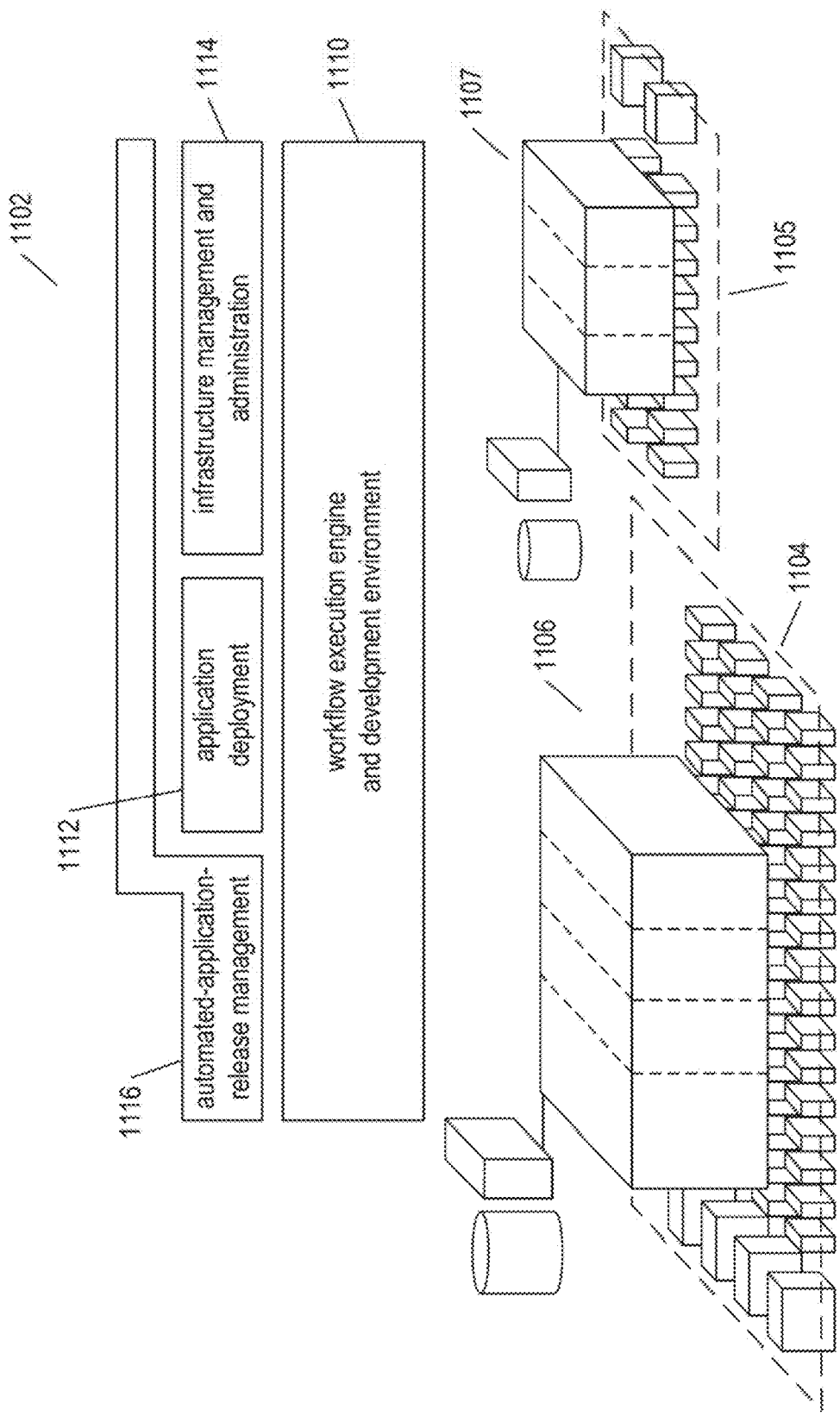
FIG. 11 shows a workflow-based cloud-management facility that has been developed to provide a powerful administrative and development interface to multiple multi-tenant cloud-computing facilities.

FIG. 11 shows workflow-based cloud-management facility that has been developed to provide a powerful administrative and development interface to multiple multi-tenant cloud-computing facilities. The workflow-based management, administration, and development facility ("WFMAD") is used to manage and administer cloud-computing aggregations, such as those discussed above with reference to FIG. 10, cloud-computing aggregations, such as those discussed above with reference to FIG. 9, and a variety of additional types of cloud-computing facilities as well as to deploy applications and continuously and automatically release complex applications on various types of cloud-computing aggregations. As shown in FIG. 11, the WFMAD 1102 is implemented above the physical hardware layers 1104 and 1105 and virtual data centers 1106 and 1107 of a cloud-computing facility or cloud-computing-facility aggregation. The WFMAD includes a workflow-execution engine and development environment 1110, an application-deployment facility 1112, an infrastructure-management-and-administration facility 1114, and an automated-application-release-management facility 1116. The workflow-execution engine and development environment 1110 provides an integrated development environment for constructing, validating, testing, and executing graphically expressed workflows, discussed in detail below. Workflows are high-level programs with many built-in functions, scripting tools, and development tools and graphical interfaces. Workflows provide an underlying foundation for the infrastructure-management-and-administration facility 1114, the application-development facility 1112, and the automated-application-release-management facility 1116. The infrastructure-management-and-administration facility 1114 provides a powerful and intuitive suite of management and administration tools that allow the resources of a cloud-computing facility or cloud-computing-facility aggregation to be distributed among clients and users of the cloud-computing facility or facilities and to be administered by a hierarchy of general and specific administrators. The infrastructure-management-and-administration facility 1114 provides interfaces that allow service architects to develop various types of services and resource descriptions that can be provided to users and clients of the cloud-computing facility or facilities, including many management and administrative services and functionalities implemented as workflows. The application-deployment facility 1112 provides an integrated application-deployment environment to facilitate building and launching complex cloud-resident applications on the cloud-computing facility or facilities. The application-deployment facility provides access to one or more artifact repositories that store and logically organize binary files and other artifacts used to build complex cloud-resident applications as well as access to automated tools used, along with workflows, to develop specific automated application-deployment tools for specific cloud-resident applications. The automated-application-release-management facility 1116 provides workflow-based automated release-management tools that enable cloud-resident-application developers to continuously generate application releases produced by automated deployment, testing, and validation functionalities. Thus, the WFMAD 1102 provides a powerful, programmable, and extensible management, administration, and development platform to allow cloud-computing facilities and cloud-computing-facility aggregations to be used and managed by organizations and teams of individuals.

Figure 12:
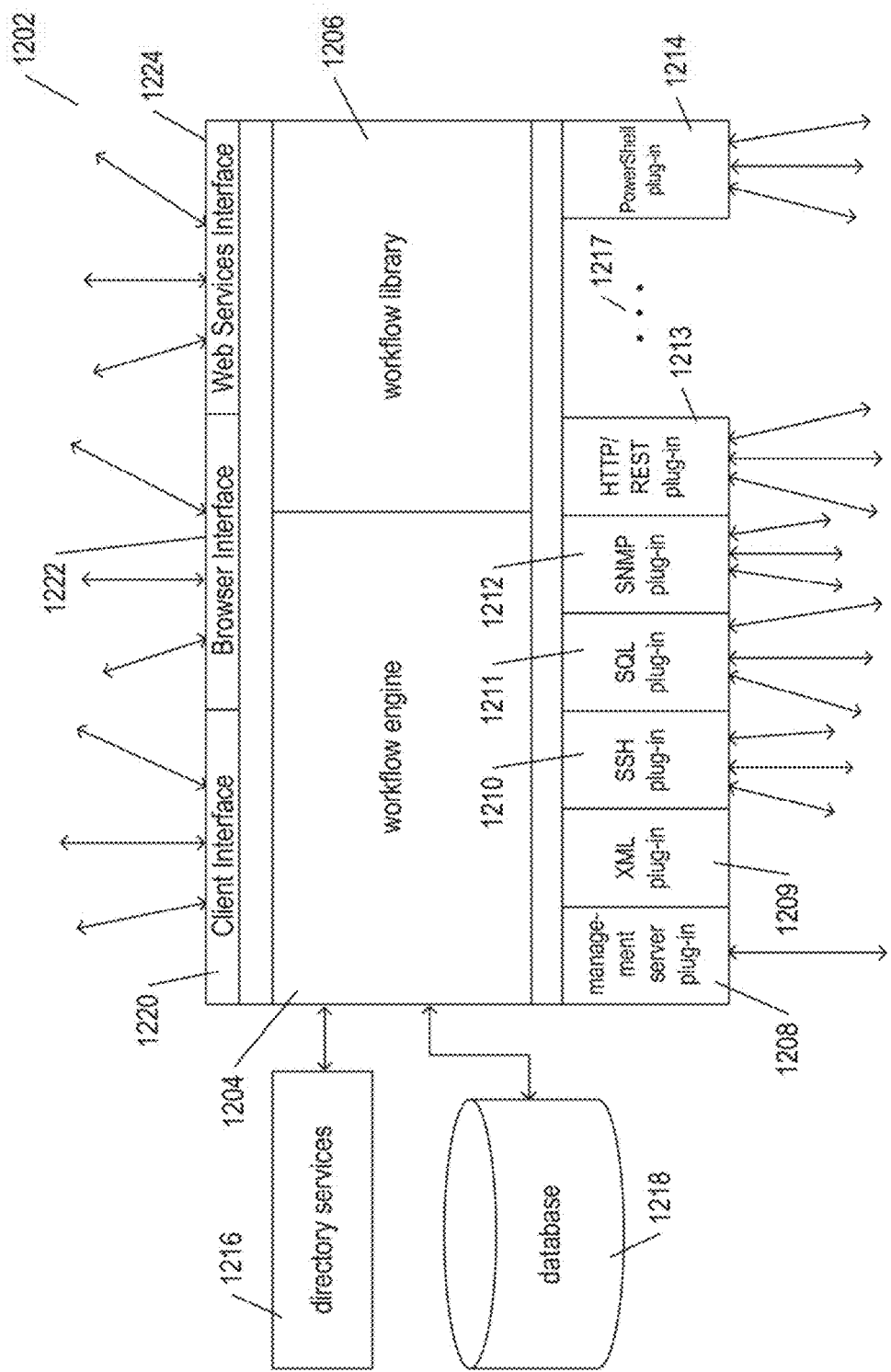
FIG. 12 provides an architectural diagram of the workflow-execution engine and development environment.

Next, the workflow-execution engine and development environment is discussed in grater detail. FIG. 12 provides an architectural diagram of the workflow-execution engine and development environment. The workflow-execution engine and development environment 1202 includes a workflow engine 1204, which executes workflows to carry out the many different administration, management, and development tasks encoded in workflows that comprise the functionalities of the WFMAD. The workflow engine, during execution of workflows, accesses many built-in tools and functionalities provided by a workflow library 1206. In addition, both the routines and functionalities provided by the workflow library and the workflow engine access a wide variety of tools and computational facilities, provided by a wide variety of third-party providers, through a large set of plug-ins 1208-1214. Note that the ellipses 1216 indicate that many additional plug-ins provide, to the workflow engine and workflow-library routines, access to many additional third-party computational resources. Plug-in 1208 provides for access, by the workflow engine and workflow-library routines, to a cloud-computing-facility or cloud-computing-facility-aggregation management server, such as a cloud director (920 in FIG. 9) or VCC server (1014 in FIG. 10). The XML plug-in 1209 provides access to a complete document object model ("DOM") extensible markup language ("XML") parser. The SSH plug-in 1210 provides access to an implementation of the Secure Shell v2 ("SSH-2") protocol. The structured query language ("SQL") plug-in 1211 provides access to a Java database connectivity ("JDBC") API that, in turn, provides access to a wide range of different types of databases. The simple network management protocol ("SNMP") plug-in 1212 provides access to an implementation of the SNMP protocol that allows the workflow-execution engine and development environment to connect to, and receive information from, various SNMP-enabled systems and devices. The hypertext transfer protocol ("HTTP")/representational state transfer ('REST") plug-in 1213 provides access to RESTweb services and hosts. The PowerShell plug-in 1214 allows the workflow-execution engine and development environment to manage PowerShell hosts and run custom PowerShell operations. The workflow engine 1204 additionally accesses directory services 1216, such as a lightweight directory access protocol ("LDAP") directory, that maintain distributed directory information and manages password-based user login. The workflow engine also accesses a dedicated database 1218 in which workflows and other information are stored. The workflow-execution engine and development environment can be accessed by clients running a client application that interfaces to a client interface 1220, by clients using web browsers that interface to a browser interface 1222, and by various applications and other executables running on remote computers that access the workflow-execution engine and development environment using a REST or small-object-access protocol ("SOAP") via a web-services interface 1224. The client application that runs on a remote computer and interfaces to the client interface 1220 provides a powerful graphical user interface that allows a client to develop and store workflows for subsequent execution by the workflow engine. The user interface also allows clients to initiate workflow execution and provides a variety of tools for validating and debugging workflows. Workflow execution can be initiated via the browser interface 1222 and web-services interface 1224. The various interfaces also provide for exchange of data output by workflows and input of parameters and data to workflows.

Figure 13A:
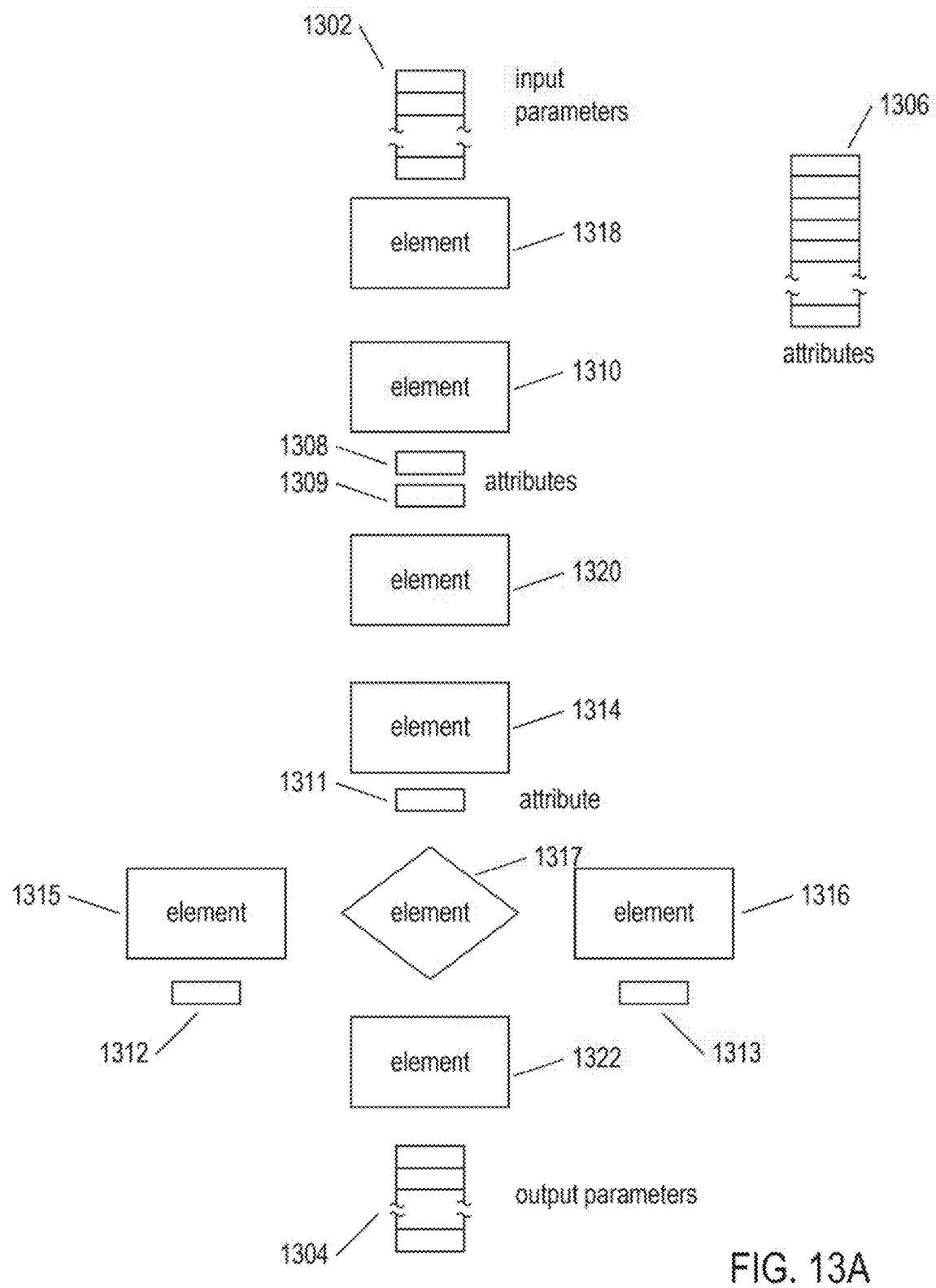
FIGS. 13A-C illustrate the structure of a workflow.
Figure 13B:
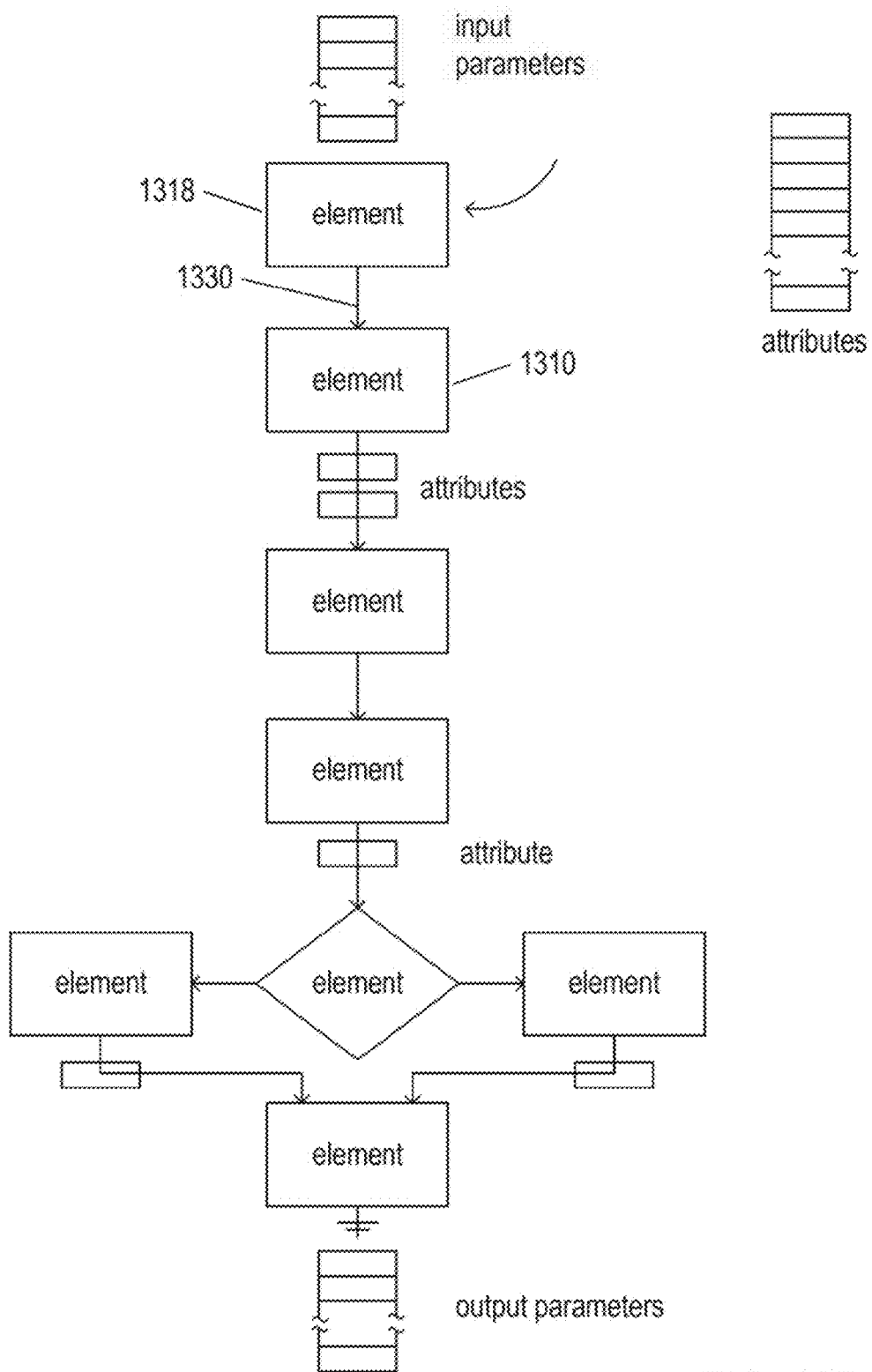
Figure 13C:
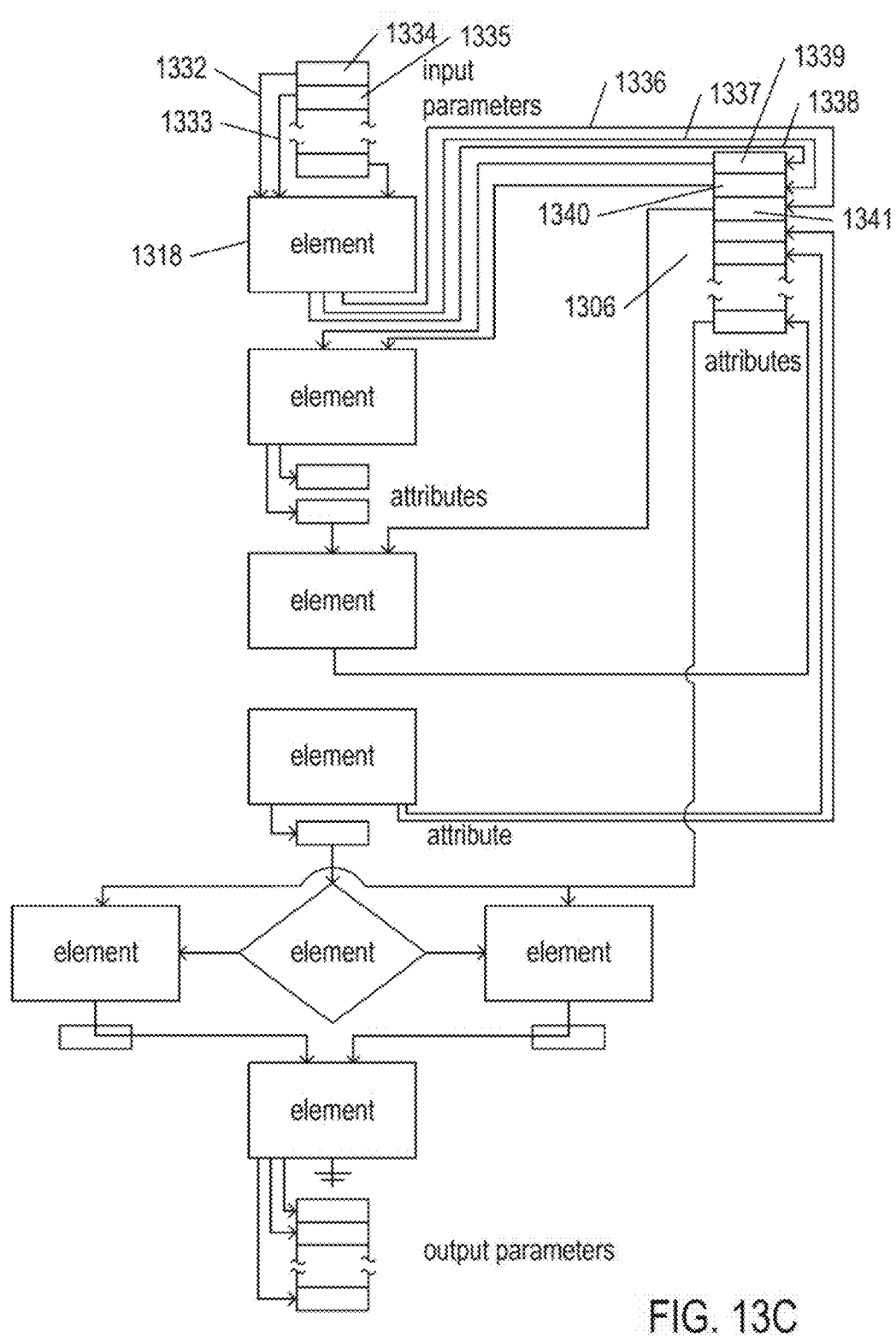

FIGS. 13A-C illustrate the structure of a workflow. A workflow is a graphically represented high-level program. FIG. 13A shows the main logical components of a workflow. These components include a set of one or more input parameters 1302 and a set of one or more output parameters 1304. In certain cases, a workflow may not include input and/or output parameters, but, in general, both input parameters and output parameters are defined for each workflow. The input and output parameters can have various different data types, with the values for a parameter depending on the data type associated with the parameter. For example, a parameter may have a string data type, in which case the values for the parameter can include any alphanumeric string or Unicode string of up to a maximum length. A workflow also generally includes a set of parameters 1306 that store values manipulated during execution of the workflow. This set of parameters is similar to a set of global variables provided by many common programming languages. In addition, attributes can be defined within individual elements of a workflow, and can be used to pass values between elements. In FIG. 13A, for example, attributes 1308-1309 are defined within element 1310 and attributes 1311, 1312, and 1313 are defined within elements 1314, 1315, and 1316, respectively. Elements, such as elements 1318, 1310, 1320, 1314-1316, and 1322 in FIG. 13A, are the execution entities within a workflow. Elements are equivalent to one or a combination of common constructs in programming languages, including subroutines, control structures, error handlers, and facilities for launching asynchronous and synchronous procedures. Elements may correspond to script routines, for example, developed to carry out an almost limitless number of different computational tasks. Elements are discussed, in greater detail, below.

As shown in FIG. 13B, the logical control flow within a workflow is specified by links, such as link 1330 which indicates that element 1310 is executed following completion of execution of element 1318. In FIG. 13B, links between elements are represented as single-headed arrows. Thus, links provide the logical ordering that is provided, in a common programming language, by the sequential ordering of statements. Finally, as shown in FIG. 13C, bindings that bind input parameters, output parameters, and attributes to particular roles with respect to elements specify the logical data flow in a workflow. In FIG. 13C, single-headed arrows, such as single-headed arrow 1332, represent bindings between elements and parameters and attributes. For example, bindings 1332 and 1333 indicate that the values of the first input parameters 1334 and 1335 are input to element 1318. Thus, the first two input parameters 1334-1335 play similar roles as arguments to functions in a programming language. As another example, the bindings represented by arrows 1336-1338 indicate that element 1318 outputs values that are stored in the first three attributes 1339, 1340, and 1341 of the set of attributes 1306.

Thus, a workflow is a graphically specified program, with elements representing executable entities, links representing logical control flow, and bindings representing logical data flow. A workflow can be used to specific arbitrary and arbitrarily complex logic, in a similar fashion as the specification of logic by a compiled, structured programming language, an interpreted language, or a script language.

FIGS. 14A-B include a table of different types of elements that may be included in a workflow. Workflow elements may include a start-workflow element 1402 and an end-workflow element 1404, examples of which include elements 1318 and 1322, respectively, in FIG. 13A. Decision workflow elements 1406-1407, an example of which is element 1317 in FIG. 13A, function as an if-then-else construct commonly provided by structured programming languages. Scriptable-task elements 1408 are essentially script routines included in a workflow. A user-interaction element 1410 solicits input from a user during workflow execution. Waiting-timer and waiting-event elements 1412-1413 suspend workflow execution for a specified period of time or until the occurrence of a specified event. Thrown-exception elements 1414 and error-handling elements 1415-1416 provide functionality commonly provided by throw-catch constructs in common programming languages. A switch element 1418 dispatches control to one of multiple paths, similar to switch statements in common programming languages, such as C and C++. A for each element 1420 is a type of iterator. External workflows can be invoked from a currently executing workflow by a workflow element 1422 or asynchronous-workflow element 1423. An action element 1424 corresponds to a call to a workflow-library routine. A workflow-note element 1426 represents a comment that can be included within a workflow. External workflows can also be invoked by schedule-workflow and nested-workflows elements 1428 and 1429.

Figure 15A:
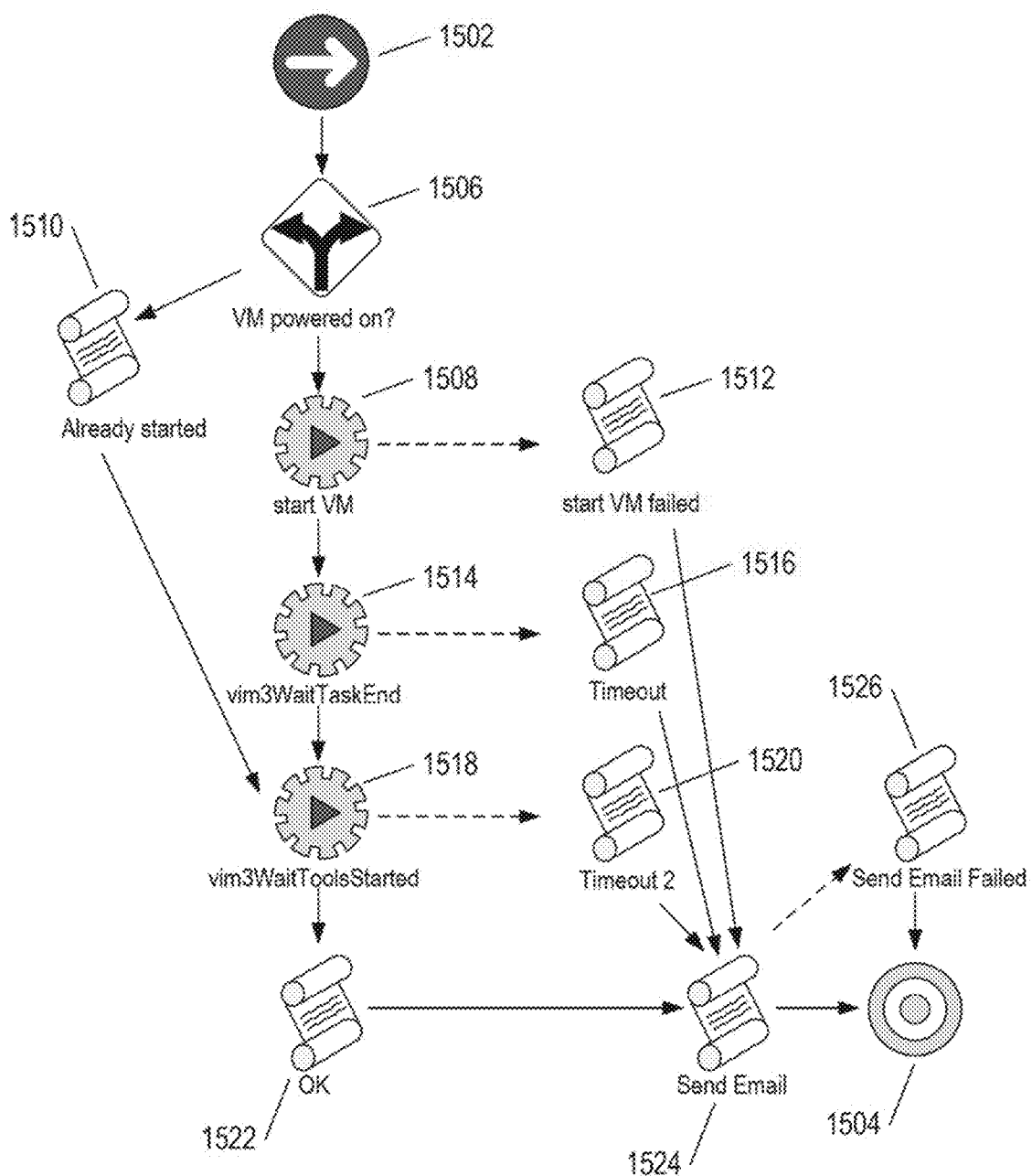
FIGS. 15A-B show an example workflow.
Figure 15B:
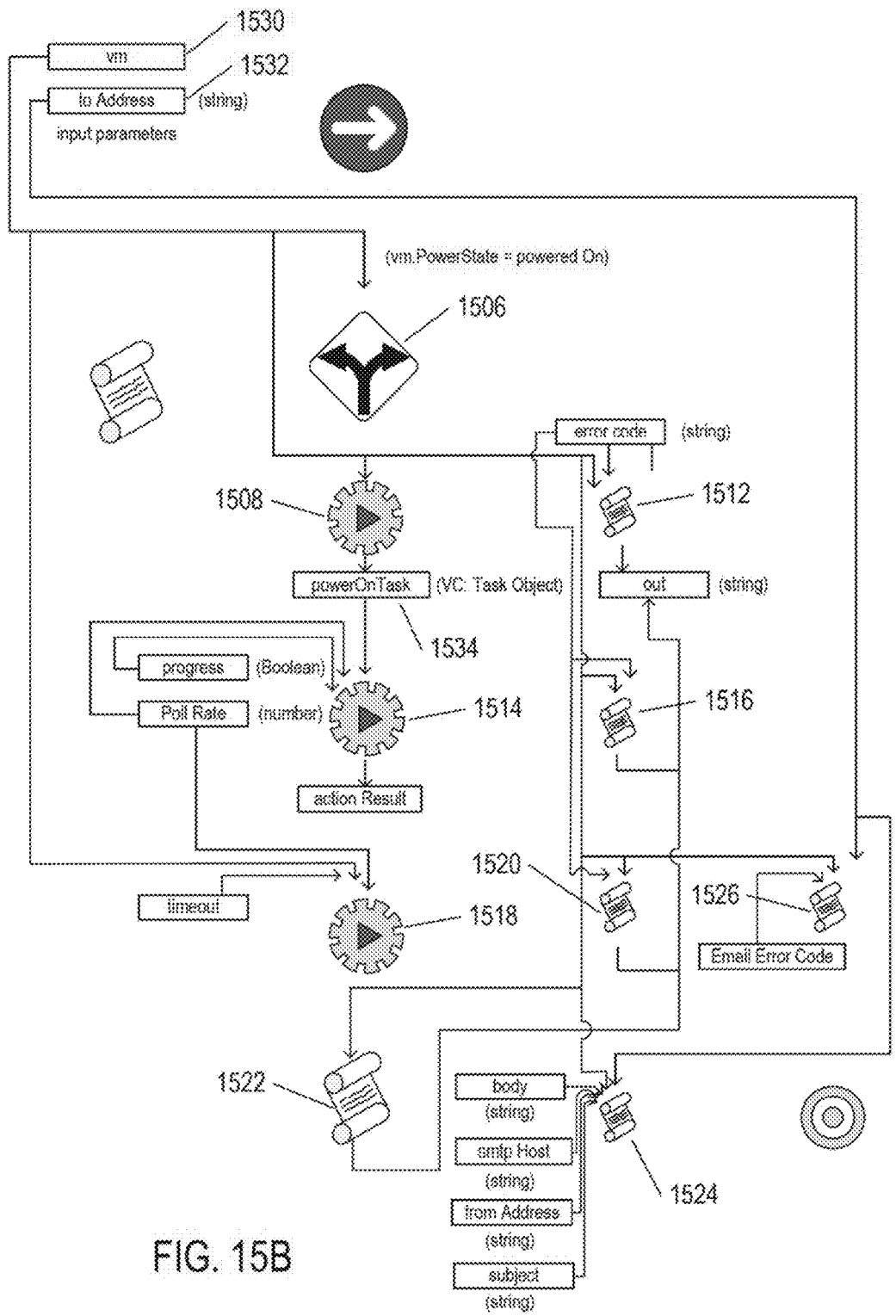

FIGS. 15A-B show an example workflow. The workflow shown in FIG. 15A is a virtual-machine-starting workflow that prompts a user to select a virtual machine to start and provides an email address to receive a notification of the outcome of workflow execution. The prompts are defined as input parameters. The workflow includes a start-workflow element 1502 and an end-workflow element 1504. The decision element 1506 checks to see whether or not the specified virtual machine is already powered on. When the VM is not already powered on, control flows to a start-VM action 1508 that calls a workflow-library function to launch the VM. Otherwise, the fact that the VM was already powered on is logged, in an already-started scripted element 1510. When the start operation fails, a start-VM-failed scripted element 1512 is executed as an exception handler and initializes an email message to report the failure. Otherwise, control flows to a vim3WaitTaskEnd action element 1514 that monitors the VM-starting task. A timeout exception handler is invoked when the start-VM task does not finish within a specified time period. Otherwise, control flows to a vim3WaitToolsStarted task 1518 which monitors starting of a tools application on the virtual machine. When the tools application fails to start, then a second timeout exception handler is invoked 1520. When all the tasks successfully complete, an OK scriptable task 1522 initializes an email body to report success. The email that includes either an error message or a success message is sent in the send-email scriptable task 1524. When sending the email fails, an email exception handler 1526 is called. The already-started, OK, and exception-handler scriptable elements 1510, 1512, 1516, 1520, 1522, and 1526 all log entries to a log file to indicate various conditions and errors. Thus, the workflow shown in FIG. 15A is a simple workflow that allows a user to specify a VM for launching to run an application.

FIG. 15B shows the parameter and attribute bindings for the workflow shown in FIG. 15A. The VM to start and the address to send the email are shown as input parameters 1530 and 1532. The VM to start is input to decision element 1506, start-VM action element 1508, the exception handlers 1512, 1516, 1520, and 1526, the send-email element 1524, the OK element 1522, and the vim3WaitToolsStarted element 1518. The email address furnished as input parameter 1532 is input to the email exception handler 1526 and the send-email element 1524. The VM-start task 1508 outputs an indication of the power on task initiated by the element in attribute 1534 which is input to the vim3WaitTaskEnd action element 1514. Other attribute bindings, input, and outputs are shown in FIG. 15B by additional arrows.

Figure 16A:
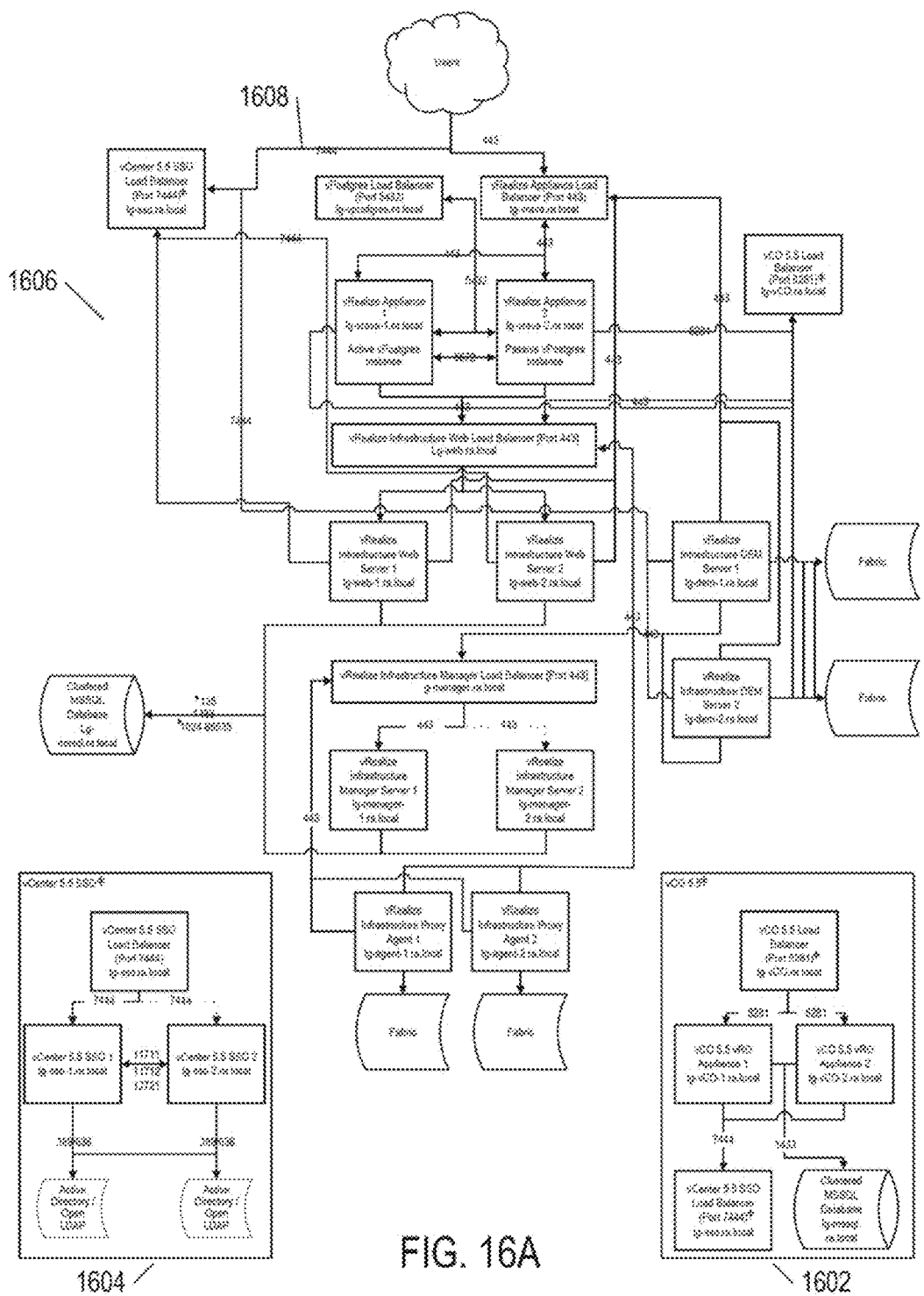

FIGS. 16A-C illustrate an example implementation and configuration of virtual appliances within a cloud-computing facility that implement the workflow-based management and administration facilities of the above-described WFMAD. FIG. 16A shows a configuration that includes the workflow-execution engine and development environment 1602, a cloud-computing facility 1604, and the infrastructure-management-and-administration facility 1606 of the above-described WFMAD. Data and information exchanges between components are illustrated with arrows, such as arrow 1608, labeled with port numbers indicating inbound and outbound ports used for data and information exchanges. FIG. 16B provides a table of servers, the services provided by the server, and the inbound and outbound ports associated with the server. Table 16C indicates the ports balanced by various load balancers shown in the configuration illustrated in FIG. 16A. It can be easily ascertained from FIGS. 16A-C that the WFMAD is a complex, multi-virtual-appliance/virtual-server system that executes on many different physical devices of a physical cloud-computing facility.

Figure 16D:
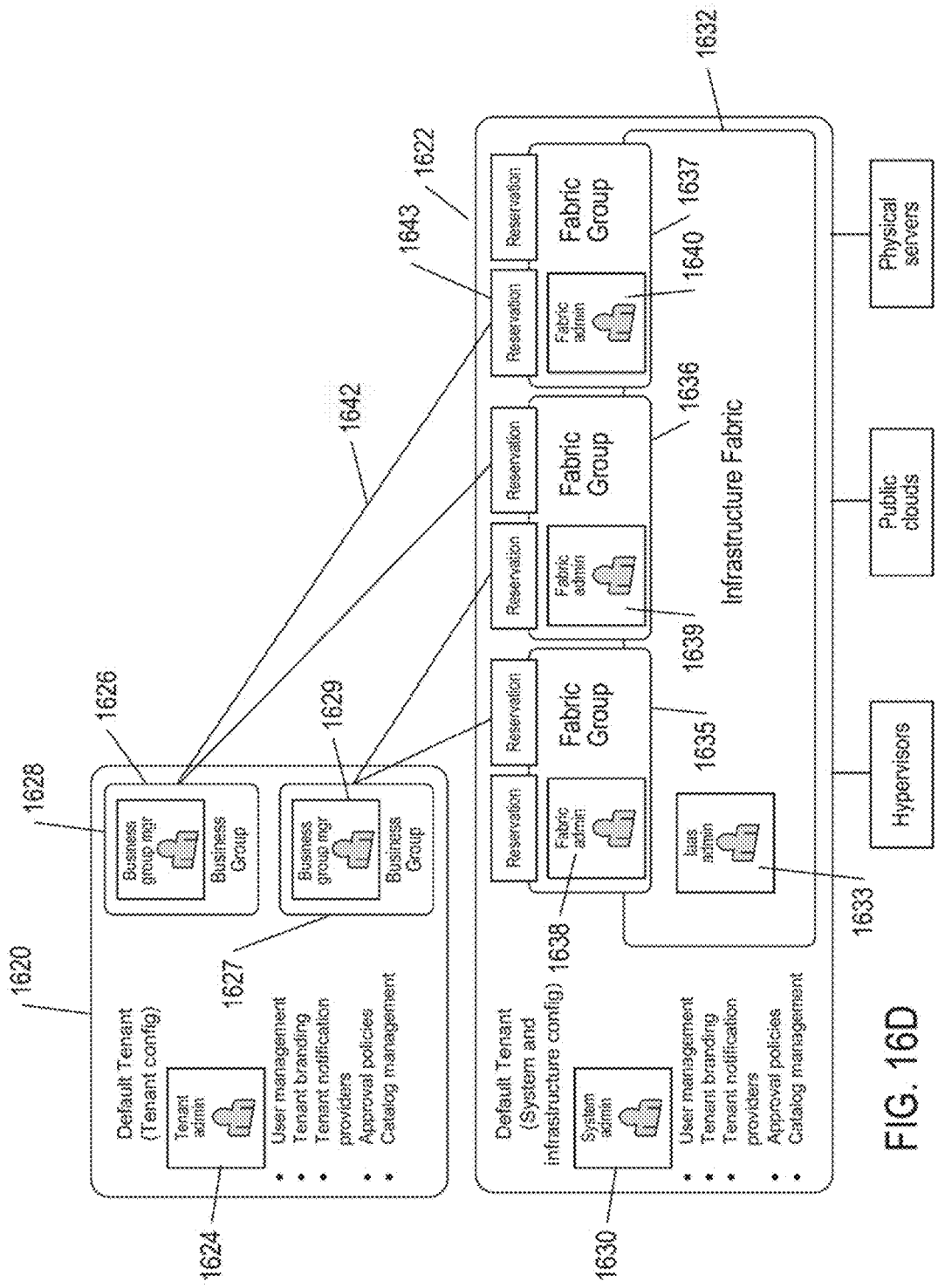
FIGS. 16D-F illustrate the logical organization of users and user roles with respect to the infrastructure-management-and-administration facility of the WFMAD.
Figure 16E:
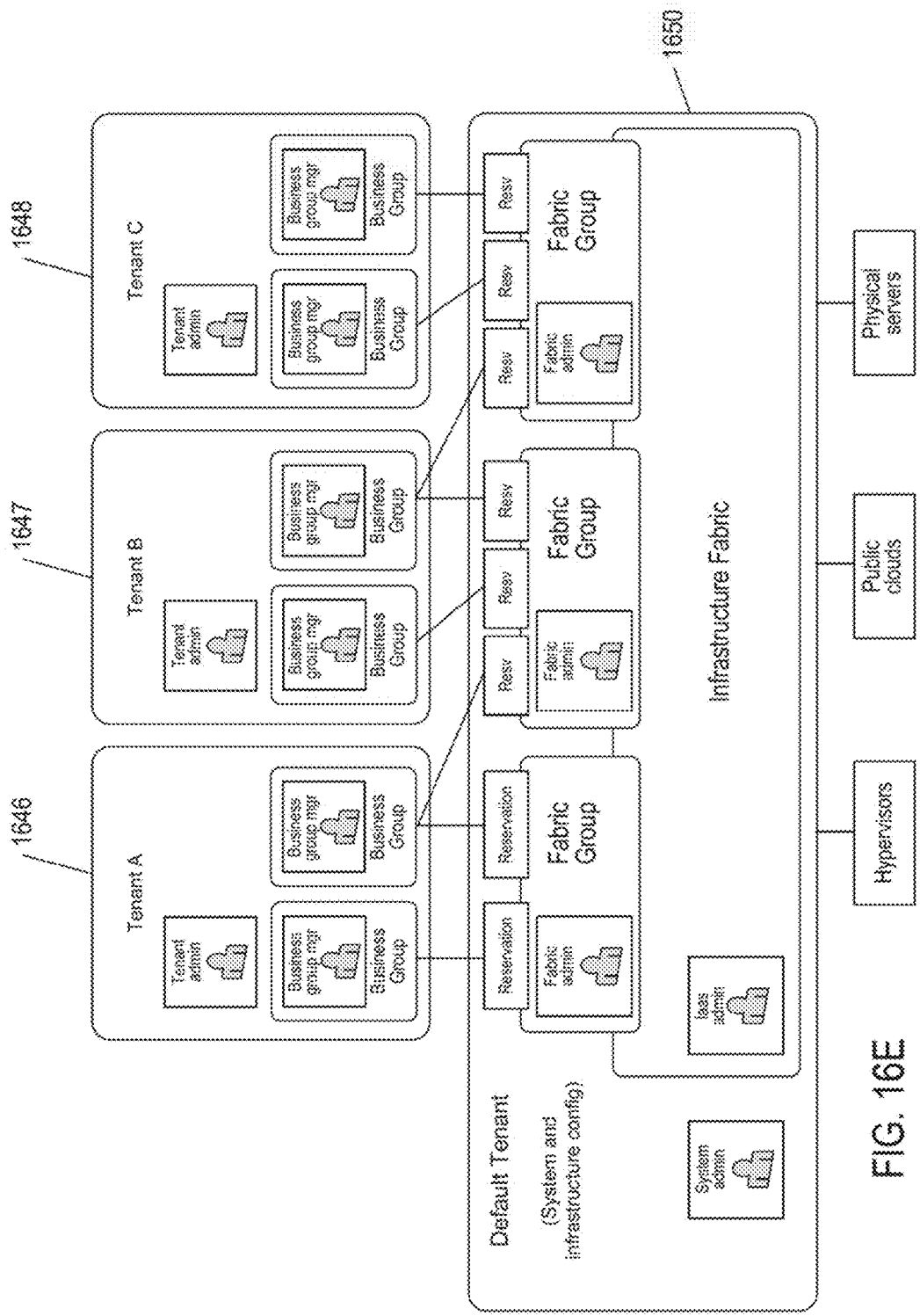
Figure 16F:
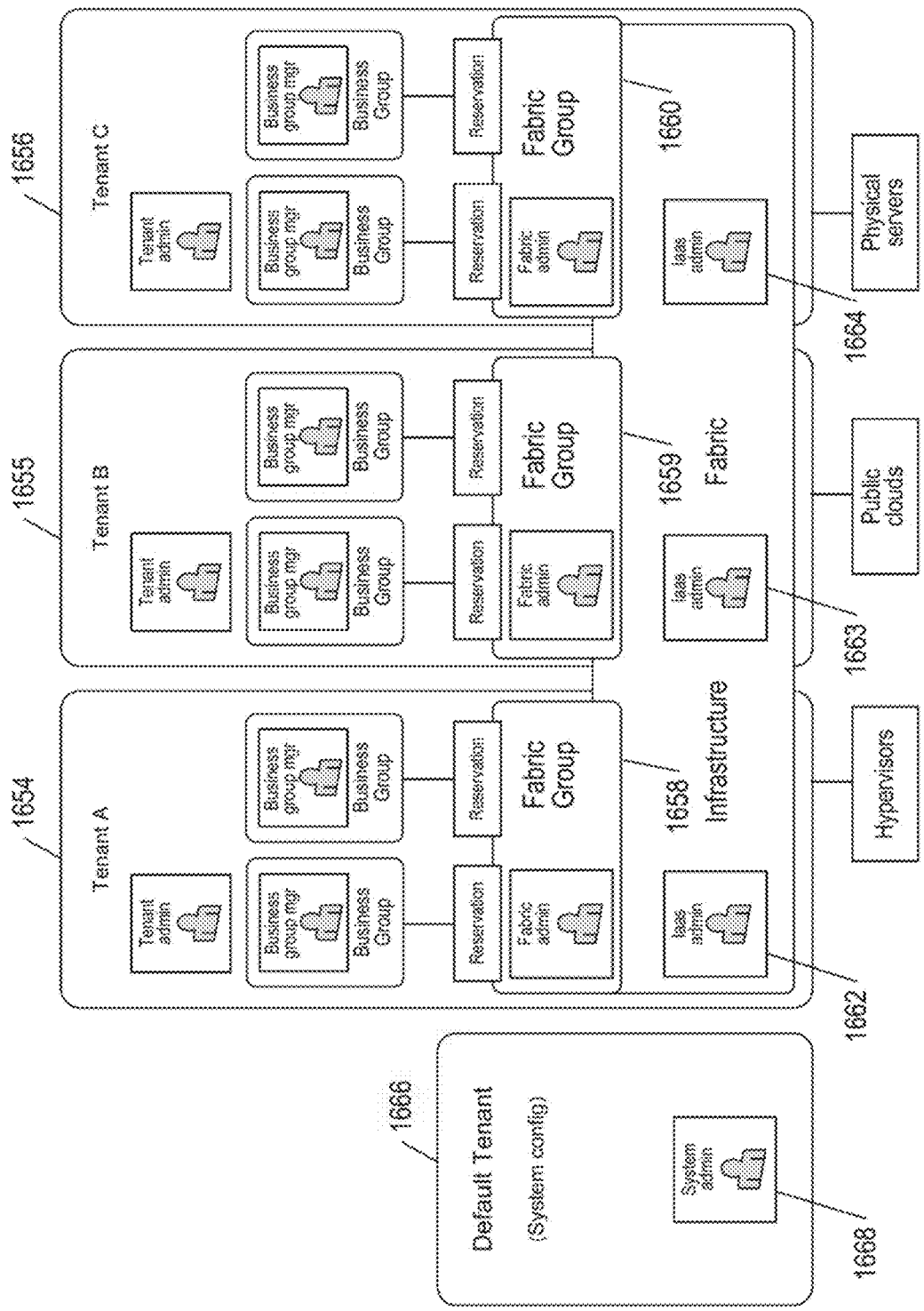

FIGS. 16D-F illustrate the logical organization of users and user roles with respect to the infrastructure-management-and-administration facility of the WFMAD (1114 in FIG. 11). FIG. 16D shows a single-tenant configuration, FIG. 16E shows a multi-tenant configuration with a single default-tenant infrastructure configuration, and FIG. 16F shows a multi-tenant configuration with a multi-tenant infrastructure configuration. A tenant is an organizational unit, such as a business unit in an enterprise or company that subscribes to cloud services from a service provider. When the infrastructure-management-and-administration facility is initially deployed within a cloud-computing facility or cloud-computing-facility aggregation, a default tenant is initially configured by a system administrator. The system administrator designates a tenant administrator for the default tenant as well as an identity store, such as an active-directory server, to provide authentication for tenant users, including the tenant administrator. The tenant administrator can then designate additional identity stores and assign roles to users or groups of the tenant, including business groups, which are sets of users that correspond to a department or other organizational unit within the organization corresponding to the tenant. Business groups are, in turn, associated with a catalog of services and infrastructure resources. Users and groups of users can be assigned to business groups. The business groups, identity stores, and tenant administrator are all associated with a tenant configuration. A tenant is also associated with a system and infrastructure configuration. The system and infrastructure configuration includes a system administrator and an infrastructure fabric that represents the virtual and physical computational resources allocated to the tenant and available for provisioning to users. The infrastructure fabric can be partitioned into fabric groups, each managed by a fabric administrator. The infrastructure fabric is managed by an infrastructure-as-a-service ("IAAS") administrator. Fabric-group computational resources can be allocated to business groups by using reservations.

FIG. 16D shows a single-tenant configuration for an infrastructure-management-and-administration facility deployment within a cloud-computing facility or cloud-computing-facility aggregation. The configuration includes a tenant configuration 1620 and a system and infrastructure configuration 1622. The tenant configuration 1620 includes a tenant administrator 1624 and several business groups 1626-1627, each associated with a business-group manager 1628-1629, respectively. The system and infrastructure configuration 1622 includes a system administrator 1630, an infrastructure fabric 1632 managed by an IAAS administrator 1633, and three fabric groups 1635-1637, each managed by a fabric administrator 1638-1640, respectively. The computational resources represented by the fabric groups are allocated to business groups by a reservation system, as indicated by the lines between business groups and reservation blocks, such as line 1642 between reservation block 1643 associated with fabric group 1637 and the business group 1626.

FIG. 16E shows a multi-tenant single-tenant-system-and-infrastructure-configuration deployment for an infrastructure-management-and-administration facility of the WFMAD. In this configuration, there are three different tenant organizations, each associated with a tenant configuration 1646-1648. Thus, following configuration of a default tenant, a system administrator creates additional tenants for different organizations that together share the computational resources of a cloud-computing facility or cloud-computing-facility aggregation. In general, the computational resources are partitioned among the tenants so that the computational resources allocated to any particular tenant are segregated from and inaccessible to the other tenants. In the configuration shown in FIG. 16E, there is a single default-tenant system and infrastructure configuration 1650, as in the previously discussed configuration shown in FIG. 16D.

FIG. 16F shows a multi-tenant configuration in which each tenant manages its own infrastructure fabric. As in the configuration shown in FIG. 16E, there are three different tenants 1654-1656 in the configuration shown in FIG. 16F. However, each tenant is associated with its own fabric group 1658-1660, respectively, and each tenant is also associated with an infrastructure-fabric IAAS administrator 1662-1664, respectively. A default-tenant system configuration 1666 is associated with a system administrator 1668 who administers the infrastructure fabric, as a whole.

System administrators, as mentioned above, generally install the WFMAD within a cloud-computing facility or cloud-computing-facility aggregation, create tenants, manage system-wide configuration, and are generally responsible for insuring availability of WFMAD services to users, in general. IAAS administrators create fabric groups, configure virtualization proxy agents, and manage cloud service accounts, physical machines, and storage devices. Fabric administrators manage physical machines and computational resources for their associated fabric groups as well as reservations and reservation policies through which the resources are allocated to business groups. Tenant administrators configure and manage tenants on behalf of organizations. They manage users and groups within the tenant organization, track resource usage, and may initiate reclamation of provisioned resources. Service architects create blueprints for items stored in user service catalogs which represent services and resources that can be provisioned to users. The infrastructure-management-and-administration facility defines many additional roles for various administrators and users to manage provision of services and resources to users of cloud-computing facilities and cloud-computing facility aggregations.

Figure 17:
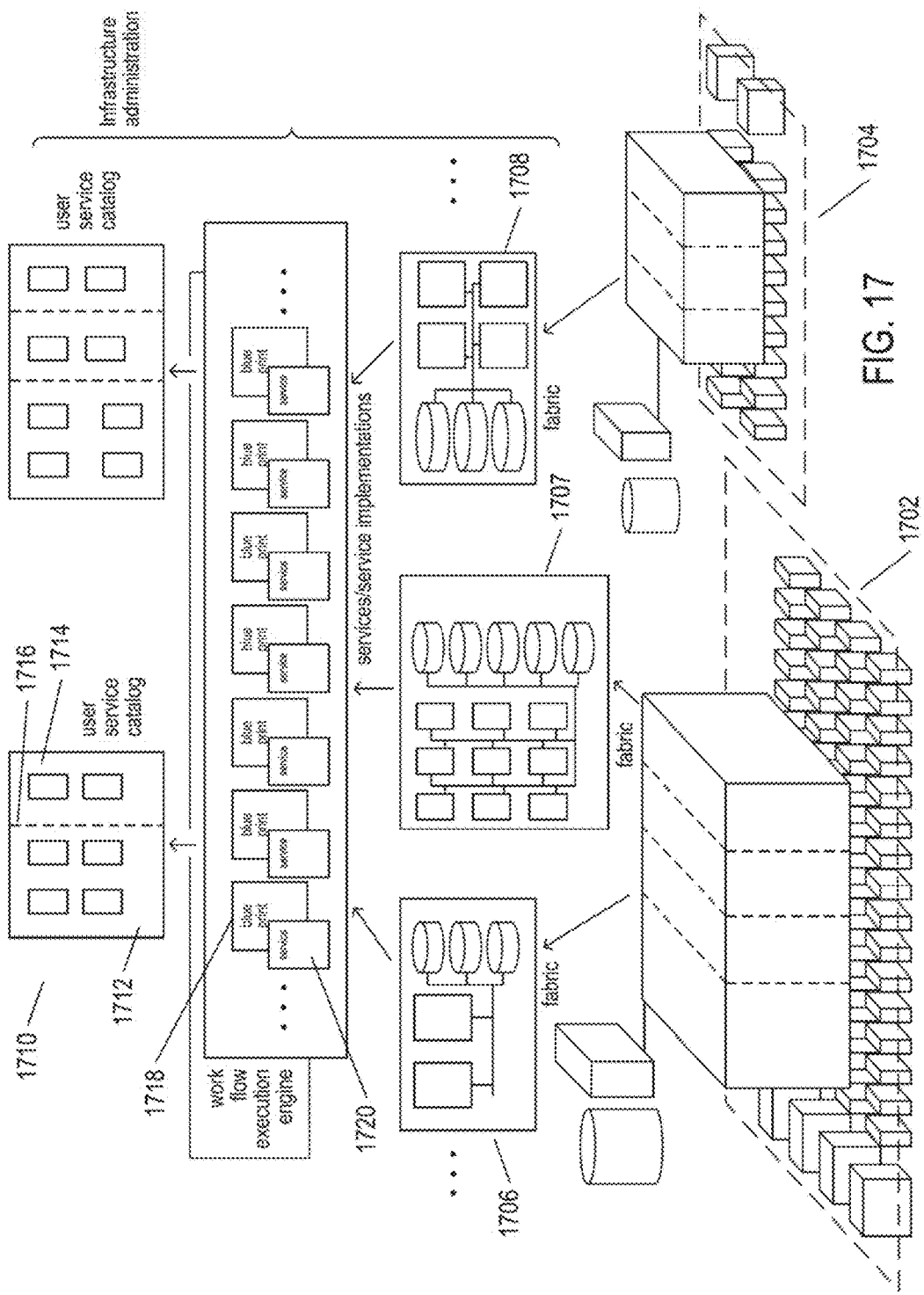
FIG. 17 illustrates the logical components of the infrastructure-management-and-administration facility of the WFMAD.

FIG. 17 illustrates the logical components of the infrastructure-management-and-administration facility (1114 in FIG. 11) of the WFMAD. As discussed above, the WFMAD is implemented within, and provides a management and development interface to, one or more cloud-computing facilities 1702 and 1704. The computational resources provided by the cloud-computing facilities, generally in the form of virtual servers, virtual storage devices, and virtual networks, are logically partitioned into fabrics 1706-1708. Computational resources are provisioned from fabrics to users. For example, a user may request one or more virtual machines running particular applications. The request is serviced by allocating the virtual machines from a particular fabric on behalf of the user. The services, including computational resources and workflow-implemented tasks, which a user may request provisioning of, are stored in a user service catalog, such as user service catalog 1710, that is associated with particular business groups and tenants. In FIG. 17, the items within a user service catalog are internally partitioned into categories, such as the two categories 1712 and 1714 and separated logically by vertical dashed line 1716. User access to catalog items is controlled by entitlements specific to business groups. Business group managers create entitlements that specify which users and groups within the business group can access particular catalog items. The catalog items are specified by service-architect-developed blueprints, such as blueprint 1718 for service 1720. The blueprint is a specification for a computational resource or task-service and the service itself is implemented by a workflow that is executed by the workflow-execution engine on behalf of a user.

FIGS. 18-20B provide a high-level illustration of the architecture and operation of the automated-application-release-management facility (1116 in FIG. 11) of the WFMAD. The application-release management process involves storing, logically organizing, and accessing a variety of different types of binary files and other files that represent executable programs and various types of data that are assembled into complete applications that are released to users for running on virtual servers within cloud-computing facilities. Previously, releases of new version of applications may have occurred over relatively long time intervals, such as biannually, yearly, or at even longer intervals. Minor versions were released at shorter intervals. However, more recently, automated application-release management has provided for continuous release at relatively short intervals in order to provide new and improved functionality to clients as quickly and efficiently as possible.

Figure 18:
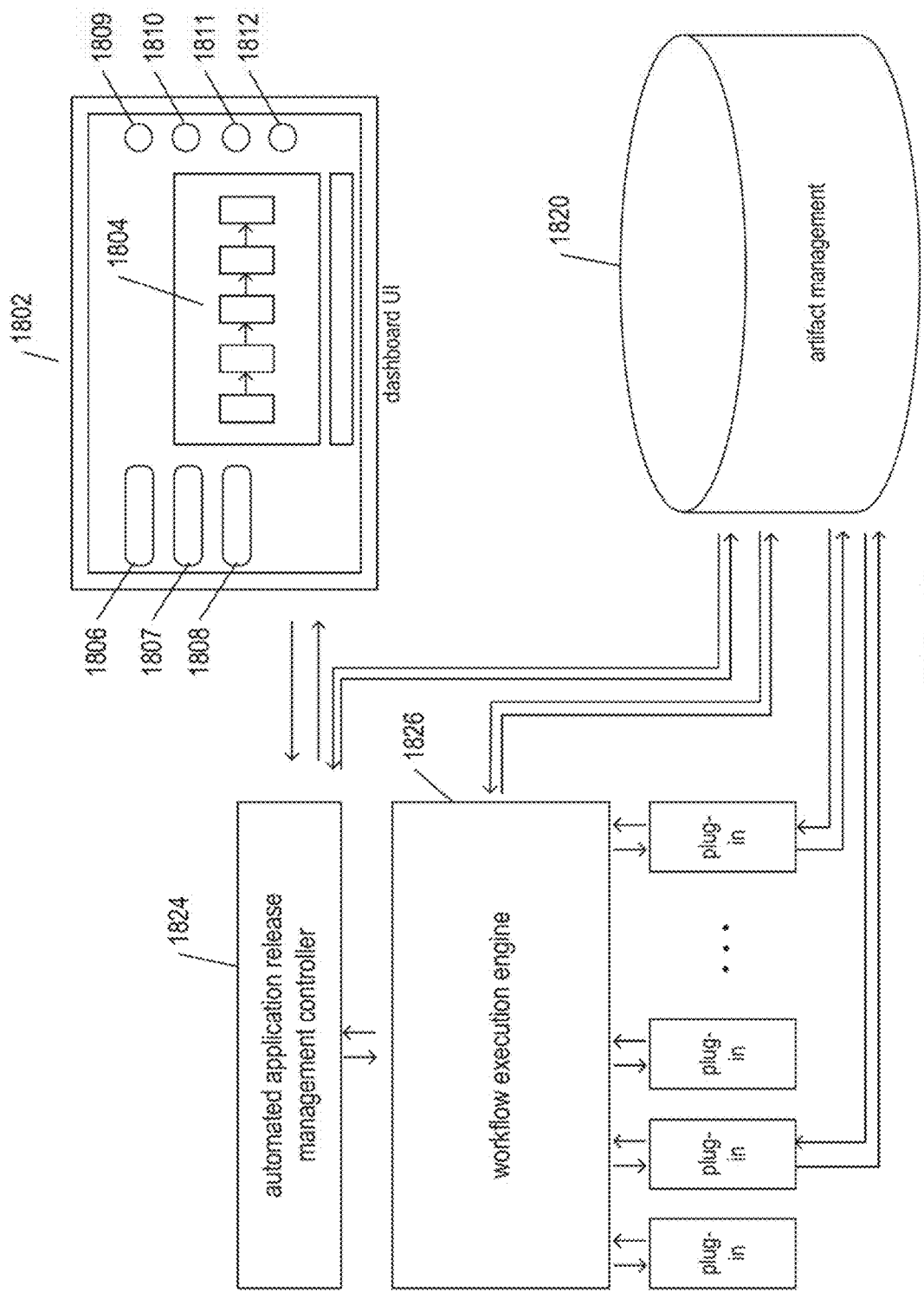
FIGS. 18-20B provide a high-level illustration of the architecture and operation of the automated-application-release-management facility of the WFMAD.

FIG. 18 shows main components of the automated-application-release-management facility (1116 in FIG. 11). The automated-application-release-management component provides a dashboard user interface 1802 to allow release managers and administrators to launch release pipelines and monitor their progress. The dashboard may visually display a graphically represented pipeline 1804 and provide various input features 1806-1812 to allow a release manager or administrator to view particular details about an executing pipeline, create and edit pipelines, launch pipelines, and generally manage and monitor the entire application-release process. The various binary files and other types of information needed to build and test applications are stored in an artifact-management component 1820. An automated-management controller 1824 sequentially initiates execution of various workflows that together implement a release pipeline and serves as an intermediary between the dashboard user interface 1802 and the workflow-execution engine 1826.

Figure 19:
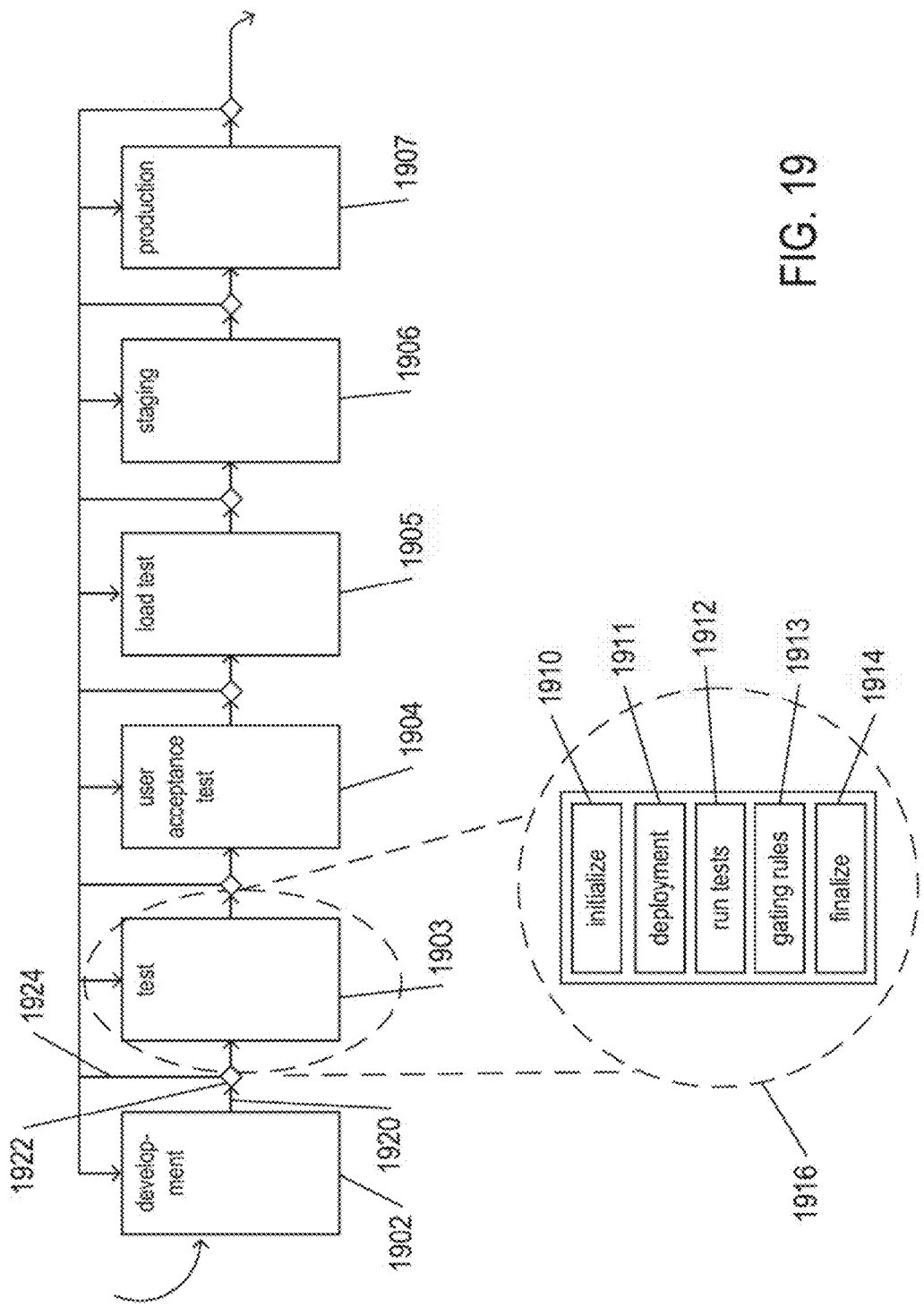

FIG. 19 illustrates a release pipeline. The release pipeline is a sequence of stages 1902-1907 that each comprises a number of sequentially executed tasks, such as the tasks 1910-1914 shown in inset 1916 that together compose stage 1903. In general, each stage is associated with gating rules that are executed to determine whether or not execution of the pipeline can advance to a next, successive stage. Thus, in FIG. 19, each stage is shown with an output arrow, such as output arrow 1920, that leads to a conditional step, such as conditional step 1922, representing the gating rules. When, as a result of execution of tasks within the stage, application of the gating rules to the results of the execution of the tasks indicates that execution should advance to a next stage, then any final tasks associated with the currently executing stage are completed and pipeline execution advances to a next stage. Otherwise, as indicated by the vertical lines emanating from the conditional steps, such as vertical line 1924 emanating from conditional step 1922, pipeline execution may return to re-execute the current stage or a previous stage, often after developers have supplied corrected binaries, missing data, or taken other steps to allow pipeline execution to advance.

Figure 20A:
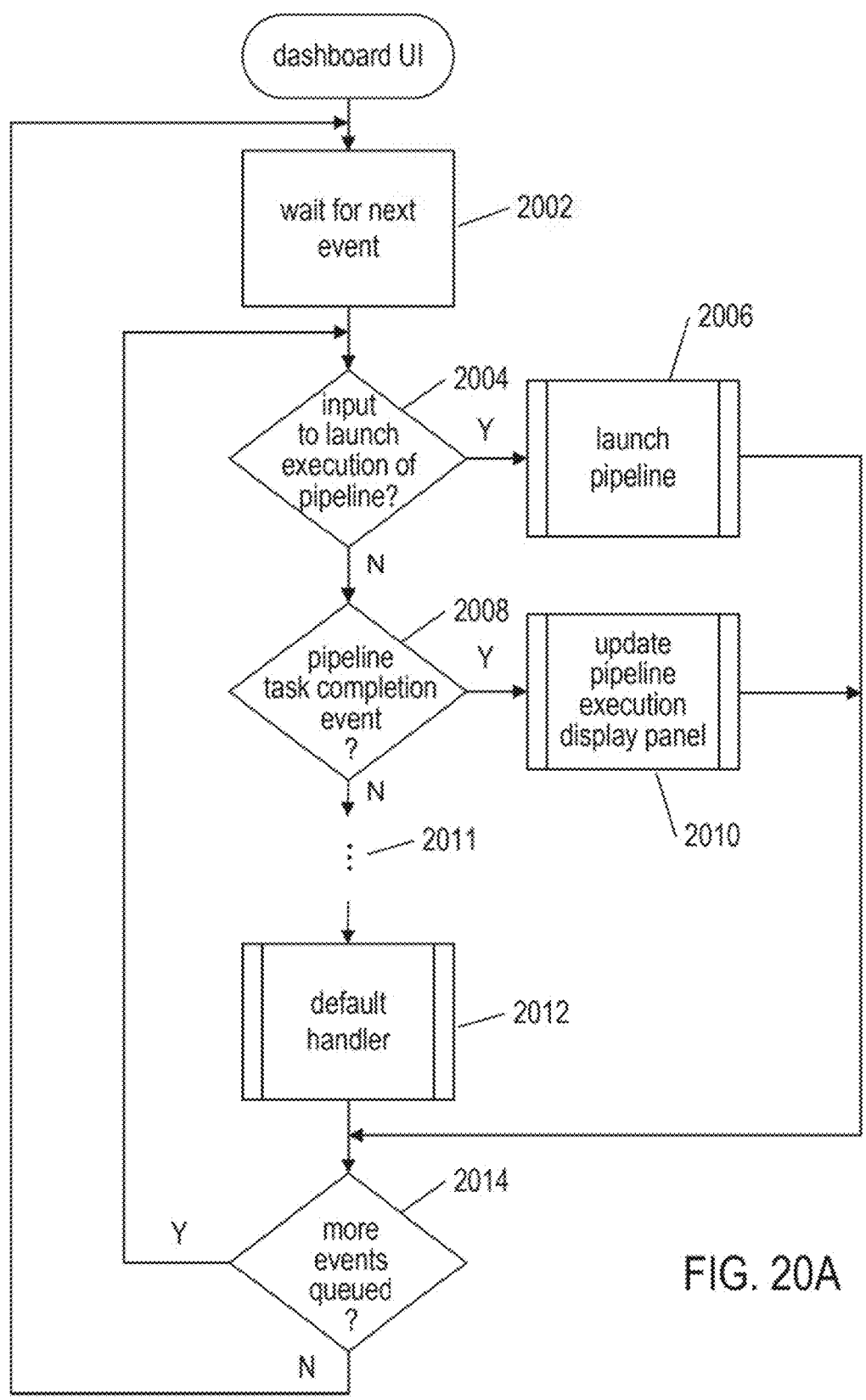
Figure 20B:
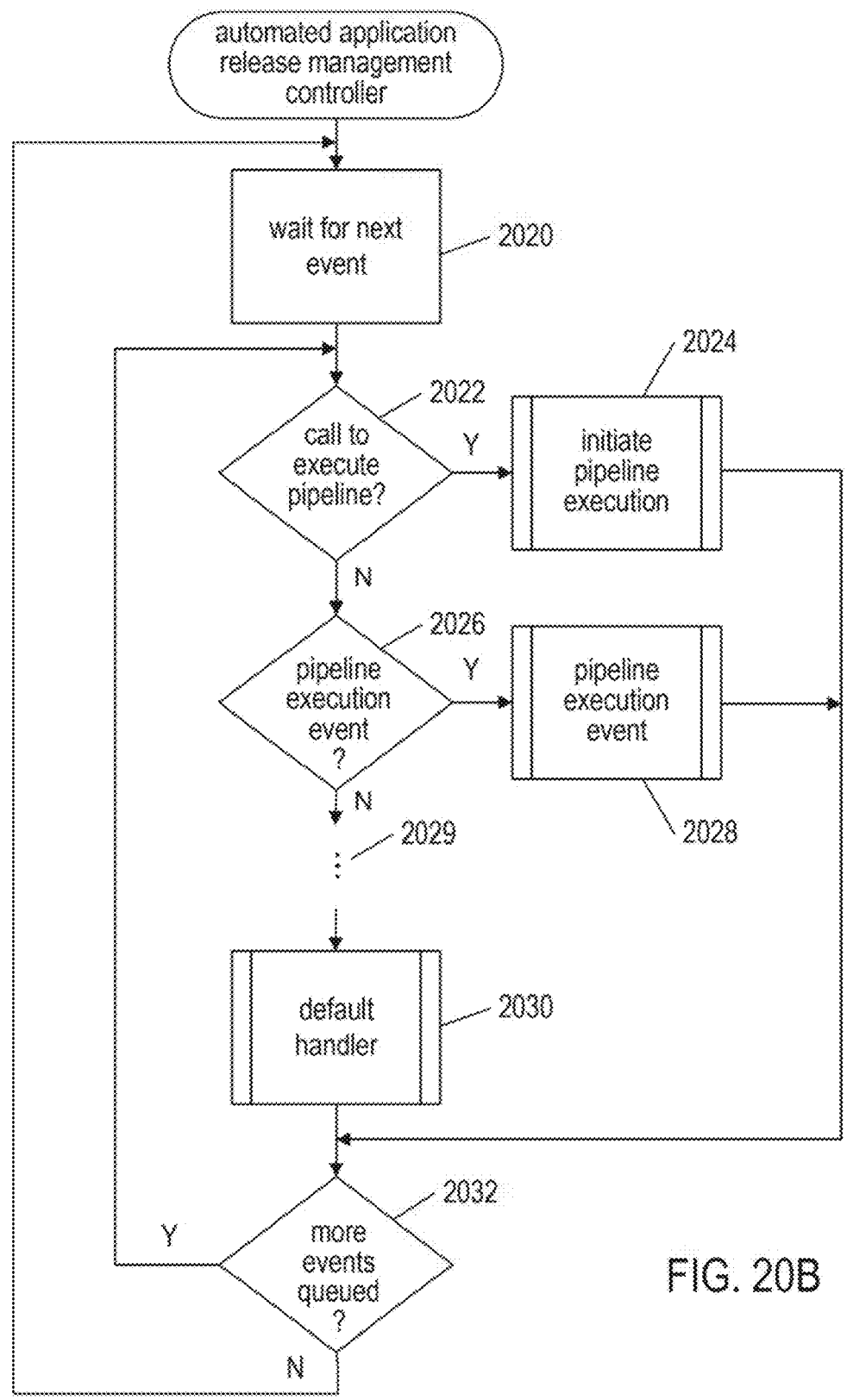

FIGS. 20A-B provide control-flow diagrams that indicate the general nature of dashboard and automated-application-release-management-subsystem management-controller operation. FIG. 20A shows a partial control-flow diagram for the dashboard user interface. In step 2002, the dashboard user interface waits for a next event to occur. When the next occurring event is input, by a release manager, to the dashboard to direct launching of an execution pipeline, as determined in step 2004, then the dashboard calls a launch-pipeline routine 2006 to interact with the management controller to initiate pipeline execution. When the next-occurring event is reception of a pipeline task-completion event generated by the management controller, as determined in step 2008, then the dashboard updates the pipeline-execution display panel within the user interface via a call to the routine "update pipeline execution display panel" in step 2010. There are many other events that the dashboard responds to, as represented by ellipses 2011, including many additional types of user input and many additional types of events generated by the management controller that the dashboard responds to by altering the displayed user interface. A default handler 2012 handles rare or unexpected events. When there are more events queued for processing by the dashboard, as determined in step 2014, then control returns to step 2004. Otherwise, control returns to step 2002 where the dashboard waits for another event to occur.

FIG. 20B shows a partial control-flow diagram for the management controller. The control-flow diagram represents an event loop, similar to the event loop described above with reference to FIG. 20A. In step 2020, the management controller waits for a next event to occur. When the event is a call from the dashboard user interface to execute a pipeline, as determined in step 2022, then a routine is called, in step 2024, to initiate pipeline execution via the workflow-execution engine. When the next-occurring event is a pipeline-execution event generated by a workflow, as determined in step 2026, then a pipeline-execution-event routine is called in step 2028 to inform the dashboard of a status change in pipeline execution as well as to coordinate next steps for execution by the workflow-execution engine. Ellipses 2029 represent the many additional types of events that are handled by the event loop. A default handler 2030 handles rare and unexpected events. When there are more events queued for handling, as determined in step 2032, control returns to step 2022. Otherwise, control returns to step 2020 where the management controller waits for a next event to occur.

Execution of Script Tasks within Application-Release-Management Pinelines

Figure 21:
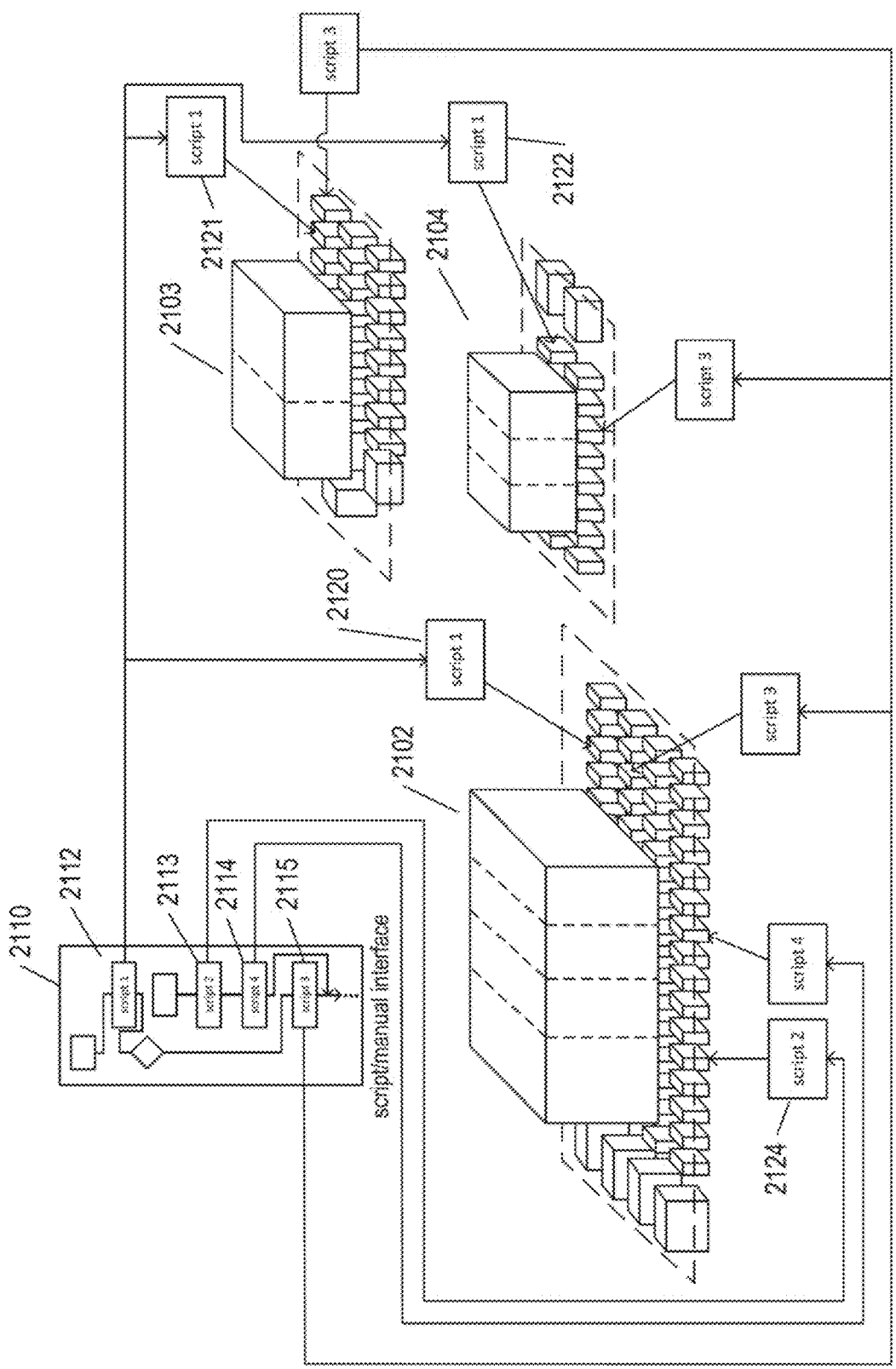
FIG. 21 illustrates legacy scripts used by previous-generation application-release tools.

FIG. 21 illustrates legacy scripts used by previous-generation application-release tools. FIG. 21 shows a number of different virtual data centers 2102-2104 managed by a common virtual-data-center administrator. In order to develop a new version of an application, the system administrator may run a script or interact with a user interface, or both, to run various script routines that carry out tasks associated with developing a new application version. In FIG. 21, a script that is launched by the administrator to run other scripts that carry out various types of tasks related to developing a new application version, including provisioning, deployment, and testing, or the administrator's interaction with an administration console or user interface to launch the scripts, is represented by a logic-containing box 2110. In the portion of the release-management logic represented by the box, execution of four different script routines is launched 2112-2115 by statements in a script executed by the administrator, manually by interaction with a user interface, or by other means, such as script-execution statements in an executable compiled from a structured-programming-language code. In certain cases, such as the launching of execution of script 1 (2112 in FIG. 21), copies of the script 2120-2122 are forwarded to various servers within the virtual data centers and execution of the forwarded scripts are launched. In other cases, such as the launching of script 2 2113, only a single script-execution is launched on a particular server 2124. The system administrator or release-management administrator may use a combination of launching of scripts, running of compiled programs, and interaction with various release-management tools and other facilities to carry out the many tasks involved in developing, testing, and releasing a next version of an application program.

In the previous subsection, a powerful workflow-based cloud-management subsystem is discussed. This workflow-based cloud-management subsystem includes an infrastructure-management-and-administration subsystem, an application-deployment subsystem, and an automated-application-release-management subsystem (112, 114, and 116 in FIG. 11). As discussed above, the automated-application-release-management subsystem provides a comprehensive user interface that allows an application-release administrator or manager to define and specify all of the many tasks that are executed in order to generate a new version of an application in an application-release-management pipeline. As discussed above, these pipelines are executed by the automated-application-release-management subsystem, providing continuous automated application development and version release. However, in many cases, it would be a formidably difficult and risk-prone strategy for an application-release manager or administrator to abandon the many release-management tools, scripts, and other facilities currently in use and completely redevelop the application-release process using the above-discussed automated-application-release-management subsystem. To address this problem, and provide an incremental path from older release-management methods and tools to the pipeline-based automated-application-release-management subsystem, the current document describes features of an automated-application-release-management subsystem that allows legacy scripts to be incorporated into an application-release-management pipeline so that the legacy scripts can become part of a newer, automated release-management process. In addition, the ability to call scripts from script tasks within an application-release-management pipeline provides increased flexibility and power to developers of application-release-management pipelines. The capability to include script tasks within application-release-management pipelines has many uses in addition to providing an incremental path from older script-based and manual release-management tools and methods to the automated-application-release-management subsystem.

Figure 22:
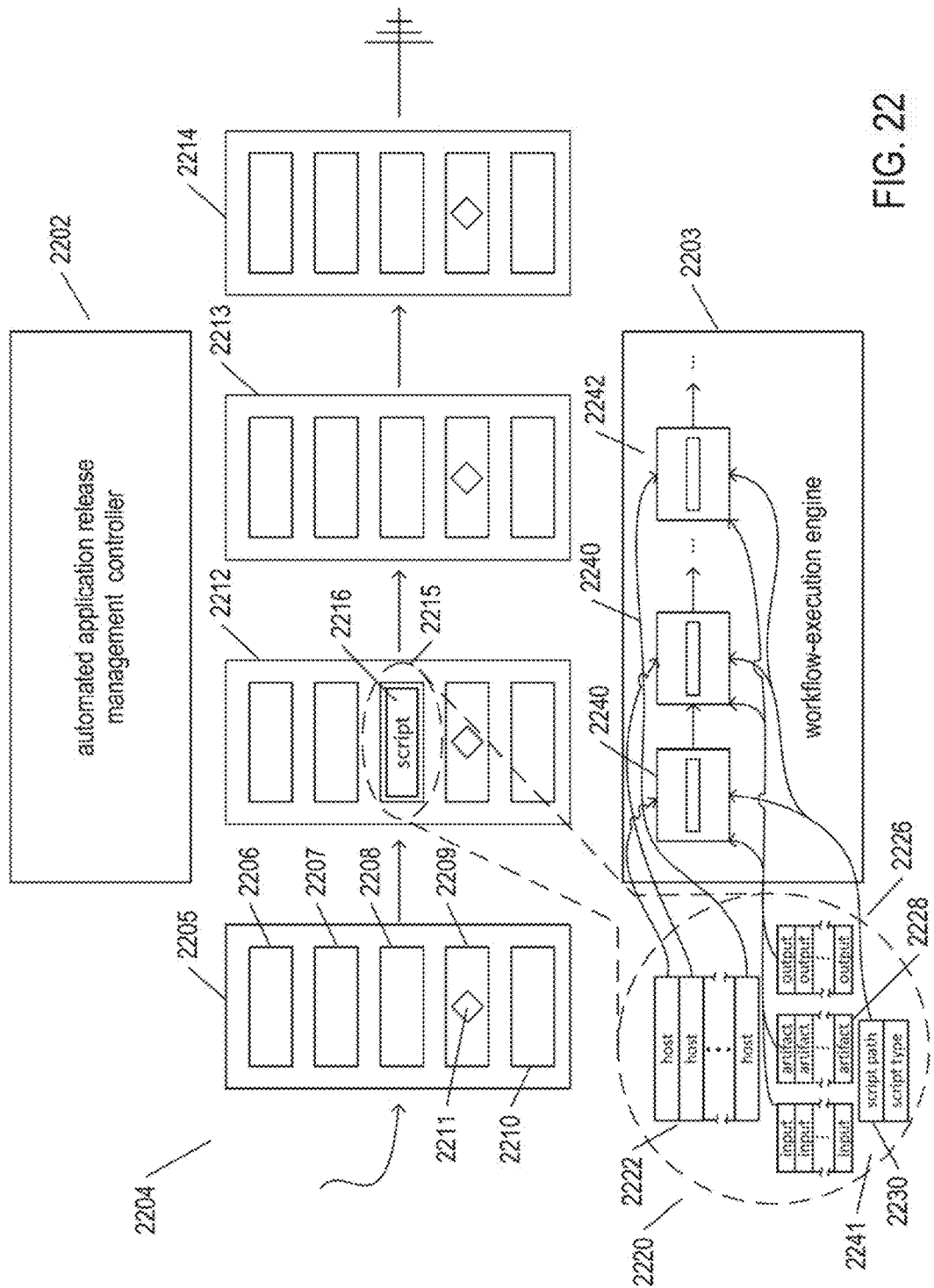
FIG. 22 shows the application-release-management-pipeline machinery of the automated-application-release-management subsystem, and discussed above with reference to FIGS. 18-20B.

FIG. 22 shows the application-release-management-pipeline machinery of the automated-application-release-management subsystem, and discussed above with reference to FIGS. 18-20B. In FIG. 22, the application-release-management-pipeline execution machinery within an automated-application-release-management subsystem, discussed above with reference to FIGS. 18-20B, is shown using block-diagram illustration conventions. This application-release-management-pipeline execution machinery includes the application-release-management-subsystem controller management controller 2202 and the workflow-execution engine 2203. A four-stage pipeline 2204 is shown in the center of FIG. 22. Each stage, including the first stage 2205, includes a number of tasks, such as tasks 2206-2210 in stage 2205. The gaiting-rule task 2209 is illustrated with a conditional-step symbol 2211.

As shown in task 2215 of stage 2212, a script 2216, such as a legacy script, can be specified as the logic to be executed by the task. This is an example of a script task that is a new feature of an application-release-management pipeline that can be used to incorporate legacy scripts into application-release-management pipelines according to the disclosure of the current document. Inset 2220 illustrates a portion of the information that is encoded in, or used by, a script task in order to launch execution of a script on one or more host computers. The information includes host-computer information 2222, including the names, network addresses, and other information needed to identify the host computers on which the script is to be run, to forward the script to the host computers, and to control the host computers to execute the script and return script output. In addition, the information includes values, or references to stored values, of input parameters for the script 2224 and the names and data types of output parameters that the script produces 2226. In addition, the information includes identifiers and access paths for various artifacts used by the script, such as artifacts stored in the artifact-management subsystem of the automated-application-release-management subsystem 2228. Additionally, the information includes a name and path for the script to be executed 2230 and an indication of the type of script 2232. This information is employed to generate workflow elements 2240-2242 for execution by the workflow-execution engine 2203. These workflow elements include the logic needed to launch execution of the script on one or more hosts defined by the list of hosts 2222, including logic to transfer input-parameter values and artifact-parameter artifacts to the host computer. The script name and path and script type 2230 and 2232 are employed to generate statements within the workflow elements to launch execution of the script on each of the specified host computers.

Figure 23A:
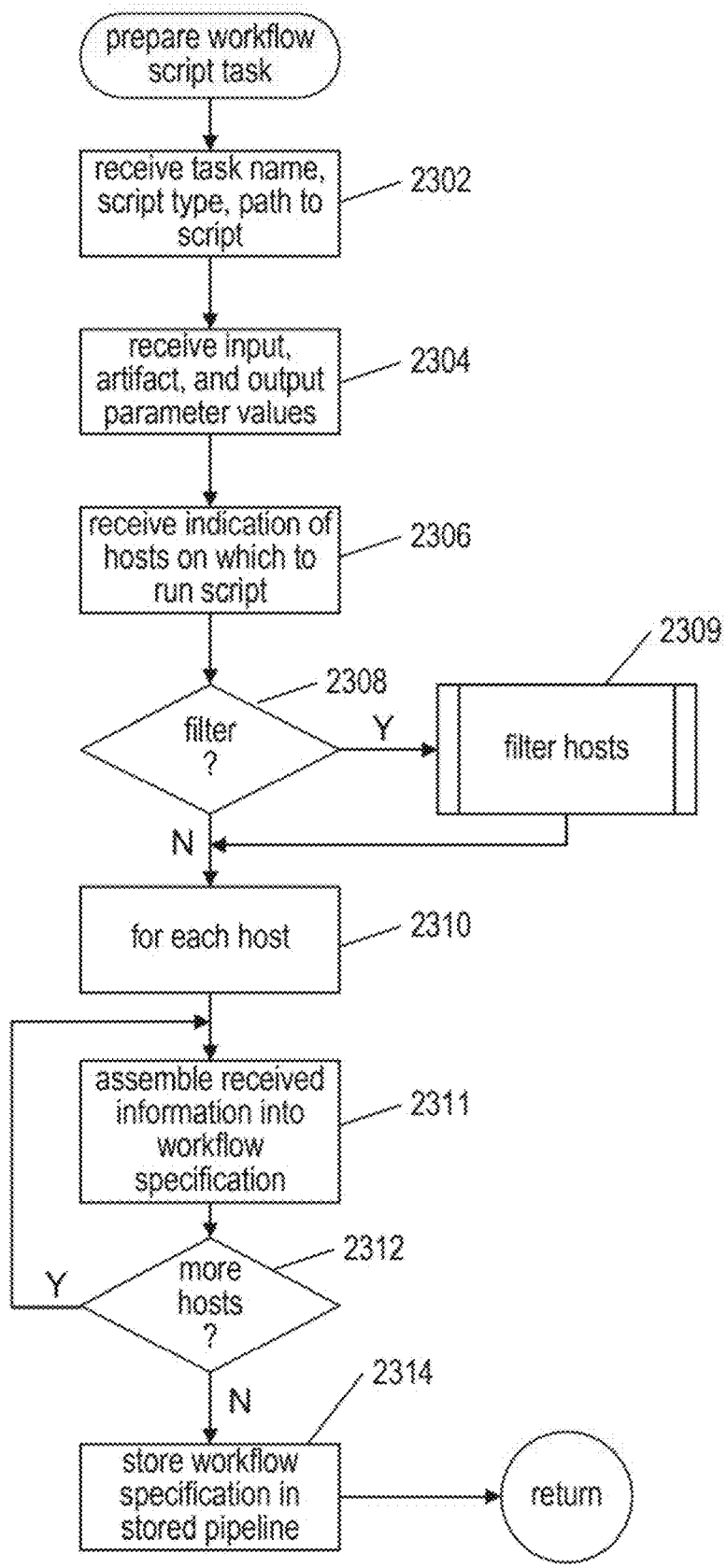
FIGS. 23A-B provide control-flow diagrams that illustrate script-task generation and execution.
Figure 23B:
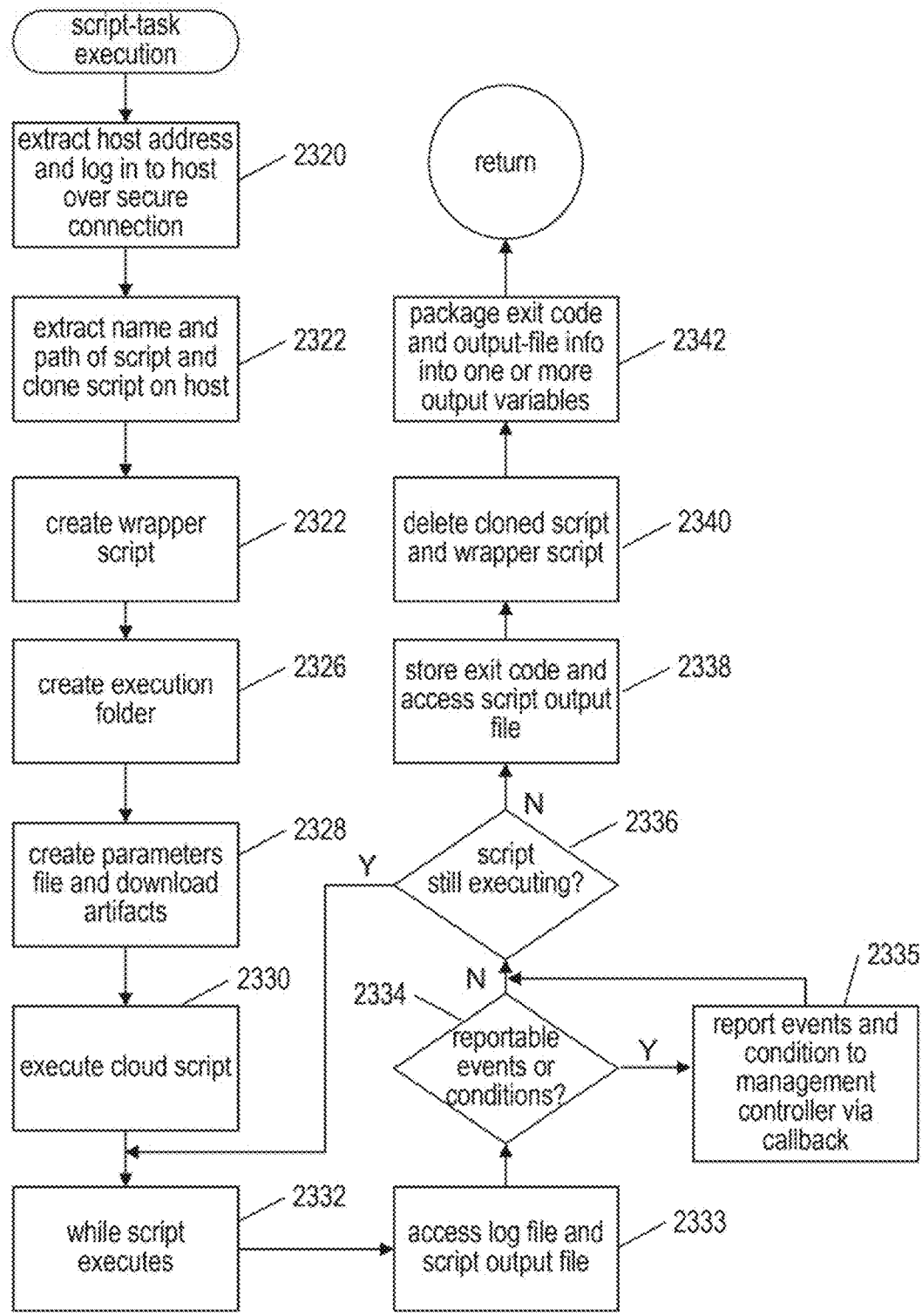

FIGS. 23A-B provide control-flow diagrams that illustrate script-task generation and execution. FIG. 23A shows the routine "prepare workflow script task," which represents the various operations involved in defining a script task for execution as part of an application-release-management pipeline. In many implementations of the automated-management controller, the functionality illustrated in FIG. 23A may be distributed across a variety of different automated-application-release-management subsystem modules.

In step 2302, a name for the script task and indications of the type of scripts and a path or URL that provides access to the script are received. In step 2304, input and output parameter values and artifact-parameter values are received. This information includes the names and types of input and output parameters as well as references to artifacts that are retrieved from the artifact-management subsystem and other sources of artifacts for transfer to host computers that execute the script when launched by the workflow-execution engine. This information allows the management controller (2202 in FIG. 22) to provide actual input values for the input parameters to the workflow-execution engine, to map output values retrieved by the workflow-execution engine from host computers on which the script runs to pipeline parameters stored in the context of the management controller and to store output values obtained following script execution into these pipeline parameters, and to access and furnish artifacts used by the script during execution of the script to the workflow-execution engine for transfer to the host computers. In this fashion, execution of a script, during execution of an application-release-management pipeline, is fully incorporated within the application-release-management-pipeline execution machinery of the management controller.

In step 2306, the routine "prepare workflow script task" receives an indication of the host computers on which the script is to be executed. This indication may include specific names and network addresses of host computers or may reference a host-computer variable or specification that stands for multiple host computers, including stand-alone host computers and host computers within data centers. The received indication may be accompanied by a filter that can be applied, either during workflow generation or at run time, to filter the lists of host computers in order to launch script execution on only a subset of the listed host computers. When a filter accompanies the indication of host computers, as determined in step 2308, then, in certain implementations, the list of host computers may be filtered in step 2309 to produce a final list of host computers. In alternative implementations, the filter may be passed to the workflow-execution engine for incorporation within the workflow so the filter can be applied at run time. In the for-loop of steps 2310-2312, the information collected in step 2302 and 2304 is assembled, for each host computer, into a workflow specification. This assembly process may involve script-task-specification generation modules within the automated-management controller, workflow-generation facilities within the workflow-execution engine, or a combination of application-release-management-controller and workflow-execution-engine facilities for generating workflow elements, data flow, and logic flow that use the information received by the routine "prepare workflow script tasks" to launch execution of a script on one or more host computers. Finally, the workflow specification is stored as a task within a stage of a stored application-release-management pipeline, in step 2314.

FIG. 23B shows script-task execution by the workflow-execution engine during execution of an application-release-management pipeline coordinated and managed by the management controller. In FIG. 23B, the logic associated with launching execution of a script on a particular host computer, as represented by workflow elements 2240, 2241, and 2242 in FIG. 22, is described. In step 2320, the script-task-execution logic extracts a host address from the workflow-element encoding and logs in to the host computer over a secure connection. In step 2322, the script-task-execution logic extracts, from the encoding of the workflow element, a name and path for the script, retrieves the script using this information, and clones the script on the host computer. In step 2324, the script-task-execution logic creates a wrapper script on the host computer to provide input, collect output, and facilitate monitoring of the script on the host computer. In step 2326, the script-task-execution logic creates an execution folder on the host computer. The execution folder contains a script parameter's file, log file entries generated by the script, a script response file that includes output values generated by the script, and a copy of the script that is executed. This information can be subsequently used by the automated-application-release-management subsystem to record and analyze script-execution data. In step 2328, the script-task-execution logic creates a script parameters file that includes all of the input that is furnished to the script as the script executes. This may include specific input-parameters values as well as downloaded artifacts or references to downloaded artifacts. In step 2330, the script-task-execution logic launches execution of the cloned script. In the while-loop of steps 2332-2336, the script-task-execution logic monitors the script as it executes on the host computer. This monitoring may involve, in certain implementations, access to a log file and/or script output file on the host computer to identify any events or conditions reported within the log file and/or script output file. When such events or conditions are detected, they are reported by the workflow-execution engine, in step 2335, back to the management controller via an event-based callback, as discussed above. The management controller may use the information to modify or augment aspects of application-release-management-pipeline execution and control and/or may report events or conditions back to the dashboard user interface for display to application-release-management administrators and managers. Once execution of a script is completed, the script-task-execution logic stores the exit code returned by the script and accesses a script output file, when such a file is generated by the script, in step 2338. The script-task-execution logic deletes the clone script and wrapper script, in step 2340, and deallocates and/or removes other resources on the host computer involved in script execution. Finally, in step 2342, the script-task-execution logic packages the exit code and information extracted from the script output file into one or more specified output variables for return to the management controller, which stores this information into pipeline variables in the execution context of the management controller. This package of information may include the execution folder or a reference to the execution folder.

Figure 24A:
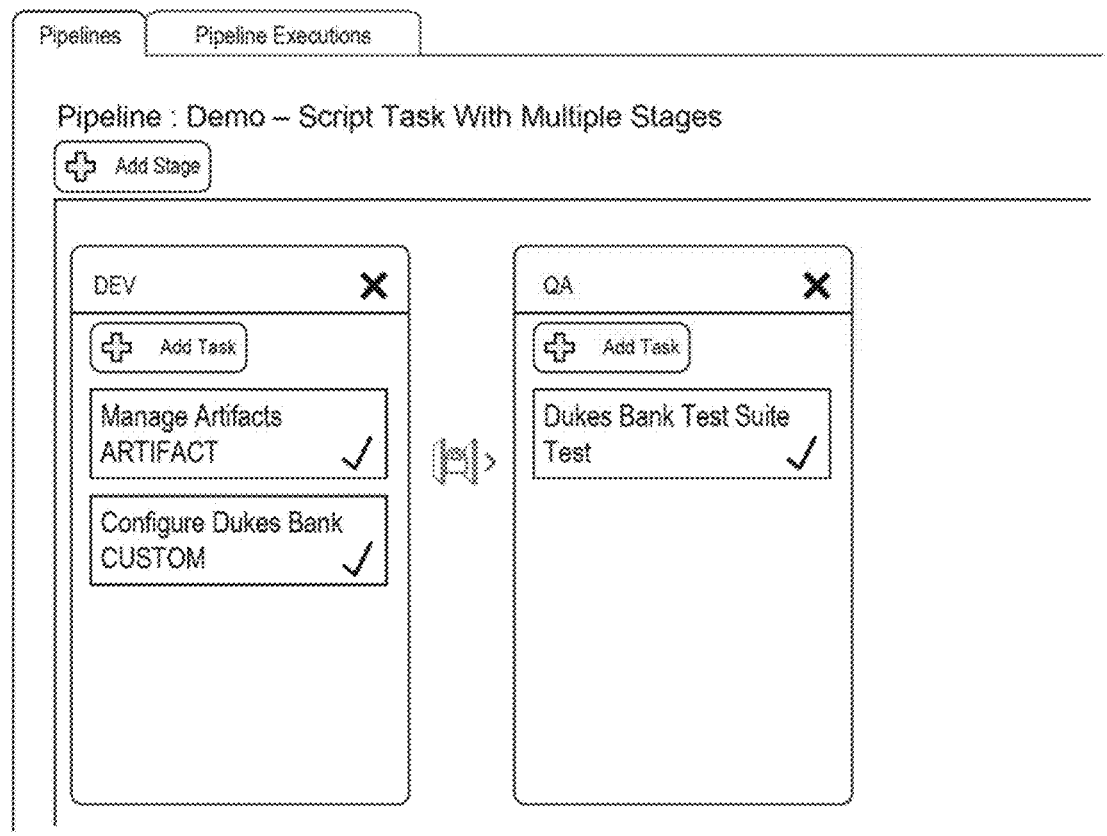
Figure 24C:
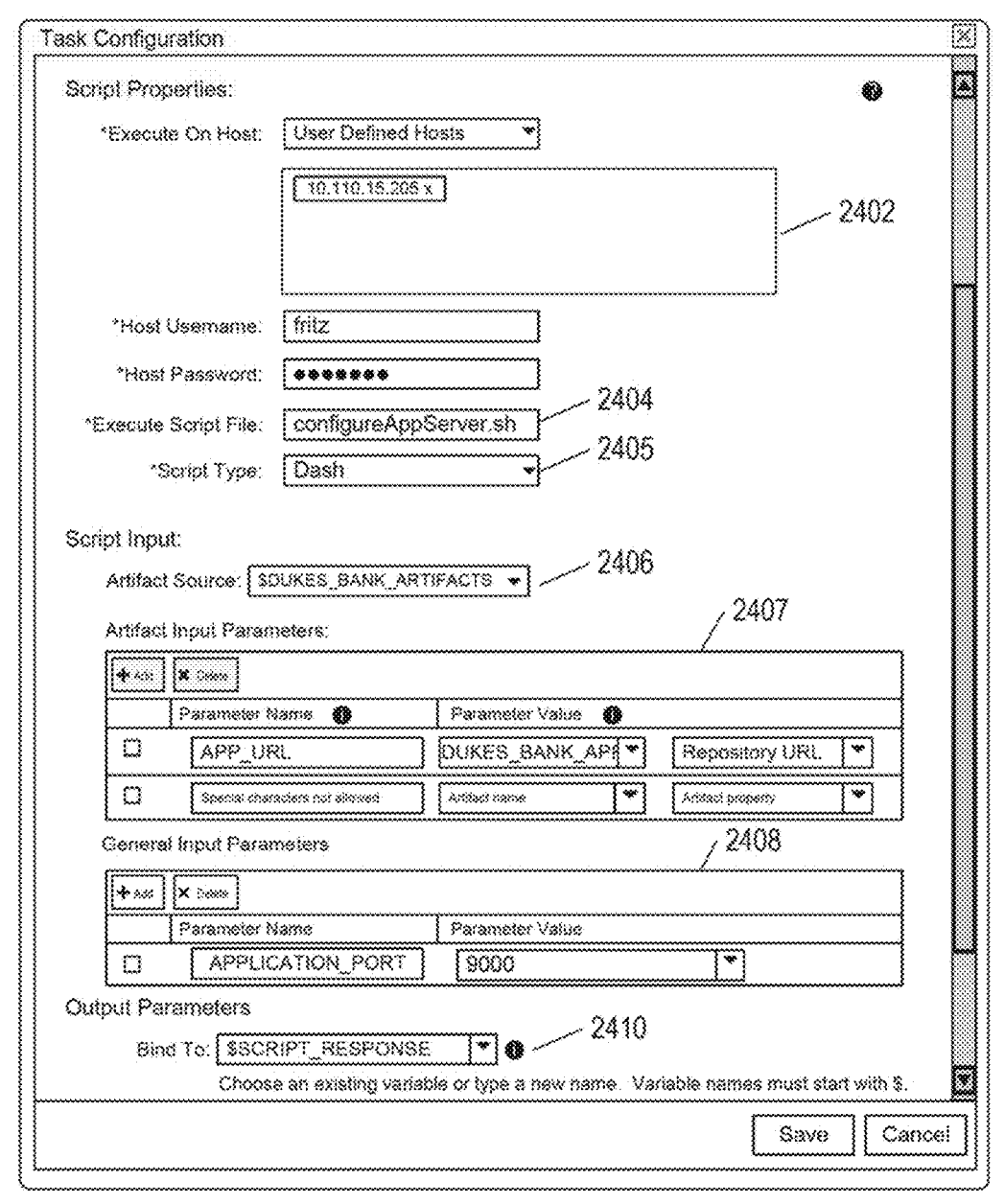
Figure 24D:
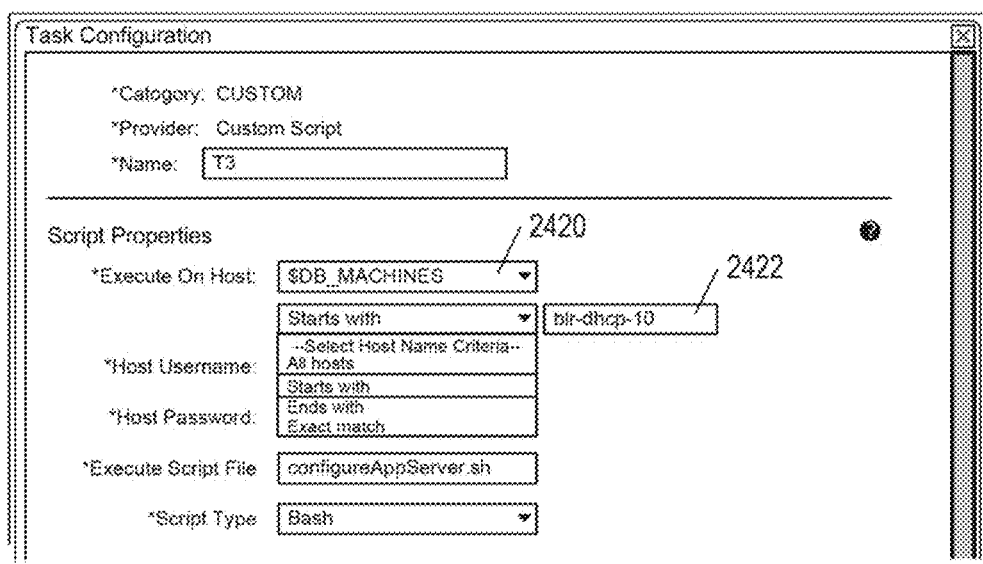
Figure 24E:
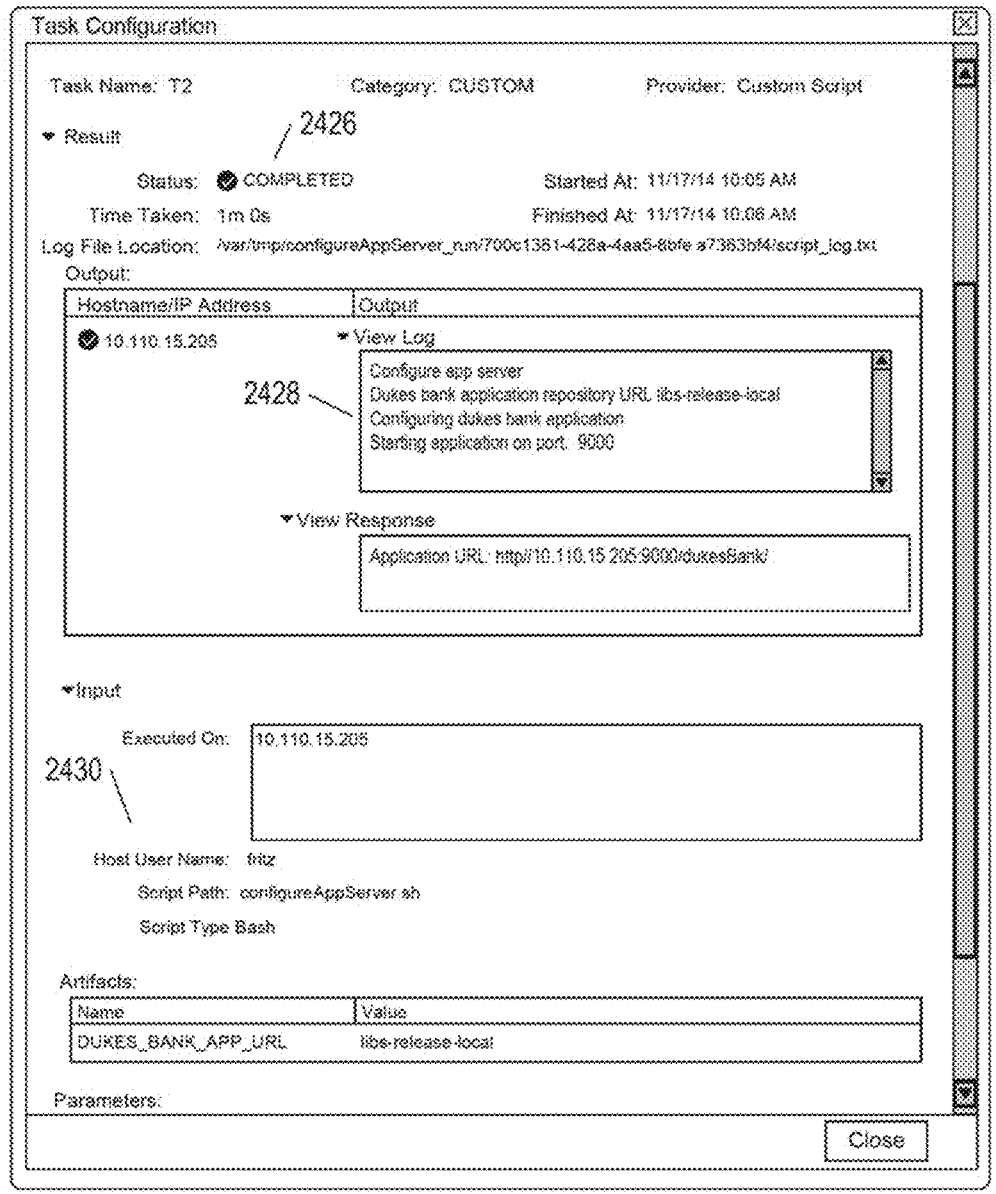

FIGS. 24A-E illustrate automated-application-release-management-subsystem user interface facilities related to creating and configuring script tasks. In FIG. 24A, a new script task comprising multiple application-release-management-pipeline stages and tasks within stages is graphically specified. FIG. 24B shows an example script that is executed by the script task graphically defined in FIG. 24A. FIG. 24C shows a user interface provided by the automated-application-release-management subsystem for configuring a script task. Text-entry features allow the script-task developer to indicate the hosts on which the script is to run 2402, specify the script and script type 2404-2405, specify artifact sources and input parameters 2406-2407, specify input parameters 2408, and specify output parameters 2410. FIG. 24D shows a user-interface panel that allows a user to specify a set of host computers on which to run a script as well as to apply a filter to this set. The set of host computers is specified, in the example shown in FIG. 24D, by a host-computer variable 2420 and the applied filter selects those host computers with names that start with a particular character string 2422. FIG. 24E shows an automated-application-release-management-subsystem user-interface display panel that displays information related to the progress of execution of a script. In the example shown in FIG. 24E, the information displayed by the panel includes a script-execution status 2426, log-file entries generated by the script on the host computer 2428, and information with regard to the script, input parameters, artifact parameters, and other information 2430.

Although the present invention has been described in terms of particular embodiments, it is not intended that the invention be limited to these embodiments. Modifications within the spirit of the invention will be apparent to those skilled in the art. For example, any of many different implementation and design parameters may be varied to produce alternative implementations of the automated-application-release-management subsystem that provides facilities for incorporating script tasks into automated-application-release-management pipelines. As discussed above, script tasks may span multiple stages of a pipeline, may comprise a single stage of a pipeline, or may comprise a single task within a single stage of a pipeline. A variety of different user-interface facilities are provided by an automated-application-release-management subsystem to collect the information needed to generate, by the management controller, a specification for the script task that is then transformed into a workflow that can be executed by the workflow-execution engine. In various different implementations, various different types of scripts can be executed on various different types of hardware, operating-system, and virtual platforms of host computers. Any of a variety of different methods and facilities can be used to collect the information needed to encode a script task, transfer this information to a host computer, and collect output information for the script for return to the management controller for incorporation into pipeline variables within the execution context of the management controller. In the described implementation, scripts are launched by the workflow-execution engine, but, in various alternative implementations, scripts may be directly launched by the management controller of an automated-application-release-management subsystem.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A workflow-based cloud-management system incorporated within a cloud-computing facility having multiple servers, data-storage devices, and one or more internal networks, the workflow-based cloud-management system comprising:

an infrastructure-management-and-administration subsystem that distributes resources among users;
a workflow-execution engine;
an application-deployment facility;
an automated-application-release-management subsystem that uses the workflow-execution engine to execute application-release-management ("ARM") pipelines that each comprises at least two stages, each stage having one or more tasks, wherein execution of each task includes launching a script on one or more host computers; and
a dashboard user interface that allows an administrator to define a hierarchy of ARM pipelines, wherein each ARM pipeline includes:
stages associated with at least one gating rule executed to determine whether execution of the pipeline can advance,
tasks assigned to the stages, and
scripts assigned to the tasks;
wherein the dashboard user interface receives administrator input to execute a first ARM pipeline, and wherein executing the first ARM pipeline causes execution of a first script of a first task of a first stage of a first ARM pipeline prior to execution of a second script of a second task of a second stage of the first ARM pipeline,
wherein at least one conditional task in the first stage of the first ARM pipeline is marked with a conditional-step symbol that corresponds to the at least one gating rule and visually indicates the at least one conditional task must be completed before execution of the second stage, and wherein, prior to execution of the second script, the gating rule causes re-execution of the first stage based on a determination that the gating rule is not satisfied.

2. The workflow-based cloud-management system of claim 1 wherein the automated-application-release-management subsystem comprises:
   a management controller;
   an interface to the workflow-execution engine; and
   an artifact-storage-and-management subsystem.

3. The workflow-based cloud-management system of claim 2 wherein the automated-application-release-management subsystem and the infrastructure-management-and-administration subsystem include control logic at least partially implemented as workflows that are executed by the workflow-execution-engine subsystem.

4. The workflow-based cloud-management system of claim 2 wherein an application-release-management pipeline stage or task that launches execution of a script on one or more host computers includes stored information that is used, by one of the management controller or workflow-execution engine, to launch execution of the script on one or more host computers.

5. The workflow-based cloud-management system of claim 4 wherein the stored information includes:
   host-computer information that identifies the host computers on which the script is to be run, that is used to forward the script to the host computers, and that is used to control the host computers to execute the script and return script output.

6. The workflow-based cloud-management system of claim 5 wherein the host-computer stored information includes the names and network addresses of one or more host computers.

7. The workflow-based cloud-management system of claim 5 wherein the stored information additionally includes:
   values, or references to stored values, of input parameters for the script;
   names and data types of output parameters that the script produces; and
   identifiers and access paths for various artifacts used by the script.

8. The workflow-based cloud-management system of claim 5 wherein the stored information additionally includes:
   a name and path for the script to be executed; and
   an indication of the type of the script to be executed.

9. The workflow-based cloud-management system of claim 4 wherein the stored information includes:
   a host-computer variable or reference that is resolved, at run time, to generate a list of host computers.

10. The workflow-based cloud-management system of claim 9 wherein the stage or task is configured with a filter that, when applied at run time to the list of host computers generated from the host-computer variable or reference, selects a subset of the listed host computers on which execution of the script is launched.

11. The workflow-based cloud-management system of claim 2 wherein the dashboard user interface provides text input facilities that allow a user to define and configure an application-release-management pipeline to launch execution of each of one or more scripts on one or more host computers.

12. A method that provides for launching of one or more scripts on one or more specified host computers by execution of an application-release-management pipeline by an automated-application-release-management-sub system component of a workflow-based cloud-management system that is incorporated within a cloud-computing facility having multiple servers, data-storage devices, and one or more internal networks, the method comprising:
   developing and configuring the application-release-management ("ARM") pipeline to include one or more stages associated with at least one gating rule executed to determine whether execution of the pipeline can advance, each stage having one of more tasks, and each task having a script, such that execution of each task launches execution of a script on one or more host computers;
   a dashboard user interface that allows an administrator to define the ARM pipeline to include a hierarchy of the stages, tasks, and scripts; and
   launching, by a management controller, execution of the ARM pipeline,
   wherein launching the ARM pipeline causes execution of a first script of a first task of a first stage of the ARM pipeline prior to execution of a second script of a second task of a second stage of the ARM pipeline,
   wherein at least one conditional task in the first stage of the first ARM pipeline is marked with a conditional-step symbol that corresponds to the at least one gating rule and visually indicates the at least one conditional task must be completed before execution of the second stage, and
   wherein, prior to execution of the second script, the gating rule causes re-execution of the first stage based on a determination that the gating rule is not satisfied.

13. The method of claim 12 wherein the workflow-based cloud-management system comprises:
   an infrastructure-management-and-administration subsystem;
   a workflow-execution engine;
   an application-deployment facility; and
   the automated-application-release-management subsystem that executes application-release-management pipelines.

14. The method of claim 13 wherein the automated-application-release-management subsystem comprises:
   the management controller;
   an interface to the workflow-execution engine; and
   an artifact-storage-and-management subsystem.

15. The method of claim 14 further including incorporating, within an application-release-management pipeline stage or task that launches execution of a script on one or more host computers, stored information that is used, by one of the management controller or workflow-execution engine, to launch execution of the script on one or more host computers.

16. The method of claim 15 wherein the stored information includes:
   host-computer information that identifies the host computers on which the script is to be run, that is used to forward the script to the host computers, and that is used to control the host computers to execute the script and return script output, the host-computer information including the names and network addresses of one or more host computers.

17. The method of claim 16 wherein the stored information additionally includes:
   values, or references to stored values, of input parameters for the script;
   names and data types of output parameters that the script produces;

identifiers and access paths for various artifacts used by the script;
a name and path for the script to be executed; and
an indication of the type of the script to be executed.

18. The method of claim 15
wherein the stored information includes a host-computer variable or reference that is resolved, at ran time, to generate a list of host computers; and
wherein the stage or task is configured with a filter that, when applied at run time to the list of host computers generated from the host-computer variable or reference, selects a subset of the listed host computers on which execution of the script is launched.

19. A non-transitory, computer-readable medium containing instructions that, when executed on one or more processors within a cloud-computing facility having multiple servers, data-storage devices, and one or more internal networks, control the cloud-computing facility to provide for launching of one or more scripts on one or more specified host computers by execution of an application-release-management pipeline by an automated-application-release-management-subsystem component of a workflow-based cloud-management system that is incorporated within the cloud-computing facility by:
developing and configuring the application-release-management ("ARM") pipeline to include one or more stages associated with at least one gating rule executed to determine whether execution of the pipeline can advance, each stage having one of more tasks, and each task having a script, such that execution of each task launches execution of a script on one or more host computers;
displaying a dashboard user interface that allows an administrator to define the ARM pipeline to include a hierarchy of the stages, tasks, and scripts; and
launching, by a management controller, execution of the ARM pipeline,
wherein launching the ARM pipeline causes execution of a first script of a first task of a first stage of the ARM pipeline prior to execution of a second script of a second task of a second stage of the ARM pipeline,
wherein at least one conditional task in the first stage of the first ARM pipeline is marked with a conditional-step symbol that corresponds to the at least one gating rule and visually indicates the at least one conditional task must be completed before execution of the second stage, and
wherein, prior to execution of the second script, the at least one gating rule causes re-execution of the first stage based on a determination that the gating rule is not satisfied.

20. The non-transitory, computer-readable storage medium of claim 19, wherein the automated-application-release-management subsystem comprises:
the management controller;
an interface to the workflow-execution engine; and
an artifact-storage-and-management subsystem.

* * * * *